US012299364B2

(12) United States Patent  
Gupta et al.

(10) Patent No.: US 12,299,364 B2  
(45) Date of Patent: May 13, 2025

(54) MULTI-ALGORITHMIC APPROACH TO REPRESENT HIGHLY NON-LINEAR HIGH DIMENSIONAL SPACE

(71) Applicant: TEXAS INSTRUMENTS INCORPORATED, Dallas, TX (US)

(72) Inventors: Nikhil Gupta, Plano, TX (US); Timothy W. Fischer, McKinney, TX (US); Ashish Khandelwal, Frisco, TX (US); Sreenivasan K. Koduri, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 881 days.

(21) Appl. No.: 17/245,306

(22) Filed: Apr. 30, 2021

(65) Prior Publication Data

US 2021/0390234 A1 Dec. 16, 2021

Related U.S. Application Data

(60) Provisional application No. 63/116,578, filed on Nov. 20, 2020, provisional application No. 63/037,385, filed on Jun. 10, 2020.

(51) Int. Cl.
*G06F 30/27* (2020.01)
*G06F 18/2415* (2023.01)
(Continued)

(52) U.S. Cl.
CPC ........ *G06F 30/27* (2020.01); *G06F 18/24155* (2023.01); *G06F 30/3308* (2020.01);
(Continued)

(58) Field of Classification Search
CPC ...... G06F 30/27; G06F 30/392; G06F 30/367; G06F 30/398; G06F 30/373;
(Continued)

(56) References Cited

U.S. PATENT DOCUMENTS

| 8,443,329 | B2 | 5/2013 | McConaghy |
| 8,756,540 | B1 | 6/2014 | Baeckler et al. |

(Continued)

OTHER PUBLICATIONS

U.S. Appl. No. 17/245,000, filed Apr. 30, 2021.
(Continued)

*Primary Examiner* — Kibrom K Gebresilassie
(74) *Attorney, Agent, or Firm* — Carl G. Peterson; Frank D. Cimino

(57) ABSTRACT

A technique for designing circuits including receiving a data object representing a circuit for a first process technology, the circuit including a first sub-circuit, the first sub-circuit including a first electrical component and a second electrical component arranged in a first topology; identifying the first sub-circuit in the data object by comparing the first topology to a stored topology, the stored topology associated with the first process technology; identifying a first set of physical parameter values associated with first electrical component and the second electrical component of the first sub-circuit; determining a set of performance parameter values for the first sub-circuit based on a first machine learning model of the first sub-circuit and the identified set of physical parameters; converting the identified first sub-circuit to a second sub-circuit for the second process technology based on the determined set of performance parameter values; and outputting the second sub-circuit.

20 Claims, 17 Drawing Sheets

(51) Int. Cl.

| | |
|---|---|
| *G06F 30/3308* | (2020.01) |
| *G06F 30/337* | (2020.01) |
| *G06F 30/367* | (2020.01) |
| *G06F 30/373* | (2020.01) |
| *G06F 30/392* | (2020.01) |
| *G06F 30/398* | (2020.01) |
| *G06N 3/045* | (2023.01) |
| *G06N 3/08* | (2023.01) |
| *G06N 3/084* | (2023.01) |
| *G06N 20/00* | (2019.01) |
| *G06N 20/20* | (2019.01) |
| *G06F 111/04* | (2020.01) |
| *G06F 111/20* | (2020.01) |

(52) U.S. Cl.
CPC .......... *G06F 30/337* (2020.01); *G06F 30/367* (2020.01); *G06F 30/373* (2020.01); *G06F 30/392* (2020.01); *G06F 30/398* (2020.01); *G06N 3/045* (2023.01); *G06N 3/08* (2013.01); *G06N 3/084* (2013.01); *G06N 20/00* (2019.01); *G06N 20/20* (2019.01); *G06F 2111/04* (2020.01); *G06F 2111/20* (2020.01)

(58) Field of Classification Search
CPC ............... G06F 30/337; G06F 30/3308; G06F 18/24155; G06F 2111/04; G06F 2111/20; G06N 20/20; G06N 20/00; G06N 3/045; G06N 3/08; G06N 3/084
See application file for complete search history.

(56) References Cited

U.S. PATENT DOCUMENTS

| | | | |
|---|---|---|---|
| 2009/0307638 A1 | 12/2009 | McConaghy | |
| 2010/0238331 A1 | 9/2010 | Umebayashi et al. | |
| 2015/0121322 A1* | 4/2015 | Chen ...................... | G06F 30/36 716/122 |
| 2016/0125120 A1 | 5/2016 | Yu et al. | |
| 2016/0224705 A1 | 8/2016 | Joshi et al. | |
| 2016/0232269 A1* | 8/2016 | Rajagopalan ......... | G06F 30/367 |
| 2016/0253445 A1* | 9/2016 | Pataky .................. | G06F 30/327 716/104 |
| 2017/0161408 A1 | 6/2017 | Sherman | |
| 2017/0363679 A1 | 12/2017 | Sika | |
| 2019/0050723 A1* | 2/2019 | Kong ...................... | G06N 3/08 |
| 2021/0081592 A1 | 3/2021 | Dandy et al. | |
| 2021/0318379 A1 | 10/2021 | Millican et al. | |
| 2021/0390232 A1 | 12/2021 | Khandelwal et al. | |
| 2021/0390233 A1 | 12/2021 | Khandelwal et al. | |
| 2021/0390239 A1 | 12/2021 | Khandelwal et al. | |

OTHER PUBLICATIONS

U.S. Appl. No. 17/245,022, filed Apr. 30, 2021.
U.S. Appl. No. 17/245,057, filed Apr. 30, 2021.
U.S. Appl. No. 17/245,083, filed Apr. 30, 2021.
U.S. Appl. No. 17/245,253, filed Apr. 30, 2021.
International Search Report, International Application No. PCT/US2022/027206, mailed Sep. 1, 2022, 4 pgs.
International Search Report, International Application No. PCT/US2022/027208, aailed Aug. 18, 2022, 5 pages.
International Search Report, International Application No. PCT/US2022/027212, mailed Sep. 1, 2022, 4 pgs.
International Search Report, International Application No. PCT/US2021/036111, mailed Aug. 26, 2021, 2 pgs.
Tobias Massier et al., "The Sizing Rules Method for CMOS and Bipolar Analog Integrated Circuit Synthesis", IEEE Transactions on Computer-Aided Design of Integrated Circuits and Systems, vol. 27, No. 12, Dec. 1, 2008, pp. 2209-2222, DOI: 10.1109/TCAD.2008.2006143, 14 pgs.
Nam Jae-Won et al., "Machine-Learning based Analog and Mixed-signal Circuit Design and Optimization", 2021 International Conference on Information Networking, pp. 874-876, XP055952944,DOJ:: 10.1109/J:COJ:N50884.2021.9333856.
Kahraman et al., "Technology Independent Circuit Sizing for Fundamental Analog Circuits Using Artificial Neural Networks", Ph.D. Research in Microelectronics and Electronics, Jun. 22, 2008, pp. 1-4, XP031303522, DOI: 10.1109/RME.2008.4595710.
Afacan Engin et al., "Review: Machine learning techniques in analog/RF integrated circuit design, synthesis, layout, and test", Integration, The VLSI Journal, North-Holland Publishing Company, vol. 77, Nov. 19, 2020, pp. 113-130, XP086449124, DOI: 10.1016/J.VLSI.2020.11.006.
Vural R.A., et al., "Process independent automated sizing methodology for current steering DAC", International Journal of Electronics, Jan. 3, 2015, pp. 1-22.
Lourenco et al., "Using Polynomial Regression and Artificial Neural Networks for Reusable Analog IC Sizing", Proceedings of the 16th Internationalconference on Synthesis, Modeling, Analysis and Simulation Methods and Applications to Circuit Design, Jul. 15, 2019 (Jul. 15, 2019), pp. 13-16.
Li: Yaping et al., "An Artificial Neural Network Assisted Optimization System for Analog Design Space Exploration", CEEE Transactions on Computer-Aided Design of Integrated Circuits and Systems, vol. 39, No. 10, Dec. 20, 2019 (Dec. 20, 2019), pp. 2640-2653.
Mohsen et al., "Automated 1-20 Analog Mixed Signal IP Generator for CMOS Technologies", Mar. 25, 2019, pp. 1-5.
Styblinski Ma et al: "Combination of Interpolation and Self-Organizing Approximation Techniques", IEEE Transactions on Computer-Aided Design of Integrated Circuits and Systems, vol. 12, No. 11, Nov. 1, 1993, DOI: 10.1109/43.248089, 12 pgs.
Trent McConaghy et al: "Template-Free Symbolic Performance Modeling of Analog Circuits via Canonical-Form Functions and Genetic Programming", IEEE Transactions on Computer-Aided Design of Integrated Circuits and Systems, vol. 28, No. 8, Aug. 1, 2009, DOI: 10.1109/TCAD.2009.2021034, 14 pgs.
Fayazi Morteza et al: "Applications of Artificial Intelligence on the Modeling and Optimization for Analog and Mixed-Signal Circuits: A Review", IEEE Transactions on Circuits and Systems I: Regular Papers, vol. 68, No. 6, Mar. 23, 2021 DOI: 10.1109/TCSI.2021.3065332, 14 pgs.
Anonymous: "Linear regression—Wikipedia", Apr. 15, 2021, pp. 1-19, https://en.wikipedia.org/w/index.php?title=Linear_regression&oldid=1017857722.
International Search Report, International Patent Application No. PCT/US2022/027209, mailed Aug. 26, 2022, 3 pgs.
Hassaupourghadi, et al., "Automated Analog Mixed Signal IP Generator for CMOS Technologies", Mar. 25, 2019, pp. 1027-1031, XP055949462, retrieved from the Internet: URL:https://apps.dtic.mil/sti/pdfgs/AD1075702.pdf.
Guyue Huang et al: "Machine Learning for Electronic Design Automation: A Survey", ARXIV.ORG, Jan. 10, 2021 (Jan. 10, 2021), https://arxiv.org/abs/2102.03357.
International Search Report mailed on Aug. 17, 2022, PCT Application No. PCT/US2022/026628 filed Apr. 28, 2022, 5 pages.
Rojec Ziga et al: "Analog circuit topology synthesis by means of evolutionary computation", Engineering Applications of Artificial Intelligence, vol. 80, Apr. 1, 2019 (Apr. 1, 2019), pp. 48-65, DOI: 10.1016/j.engappai.2019.01.012.
Written Opinion mailed on Aug. 17, 2022, PCT Application No. PCT/US2022/026628, filed Apr. 28, 2022, 10 pages.
IPRP mailed on Nov. 9, 2023, PCT Application No. PCT/US2022/027206 filed May 2, 2022, 10 pages.

* cited by examiner

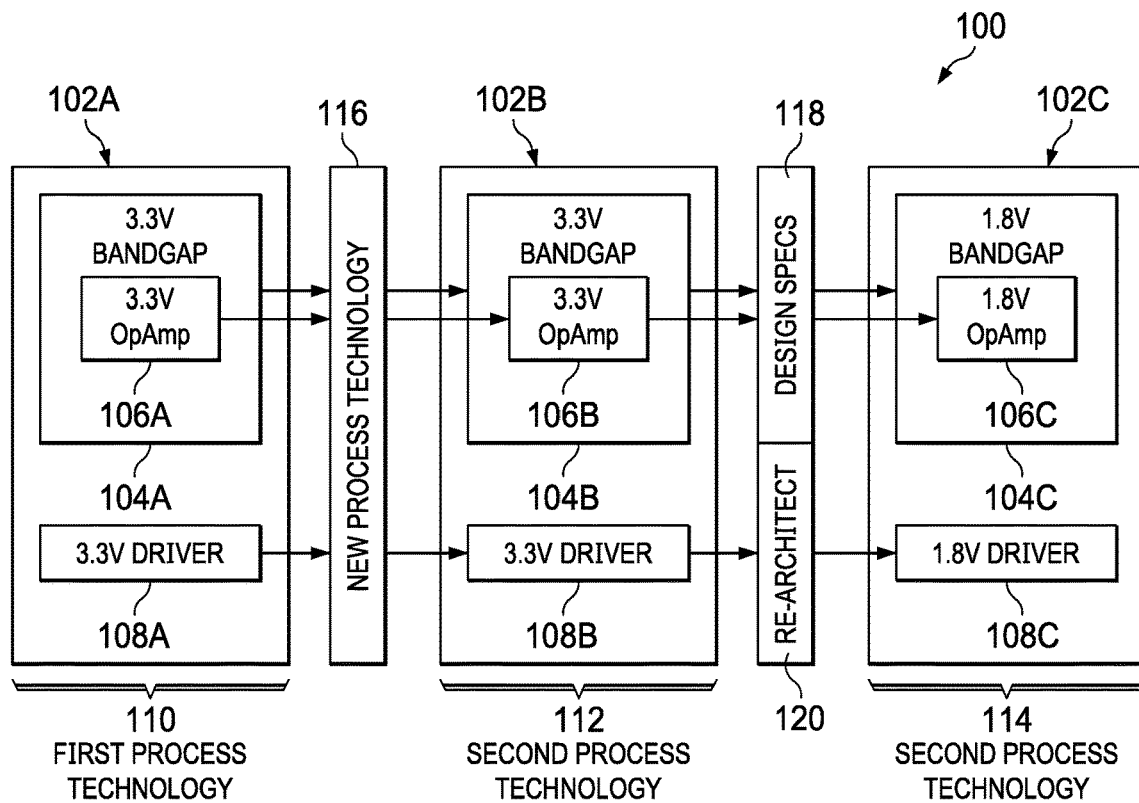
FIG. 1
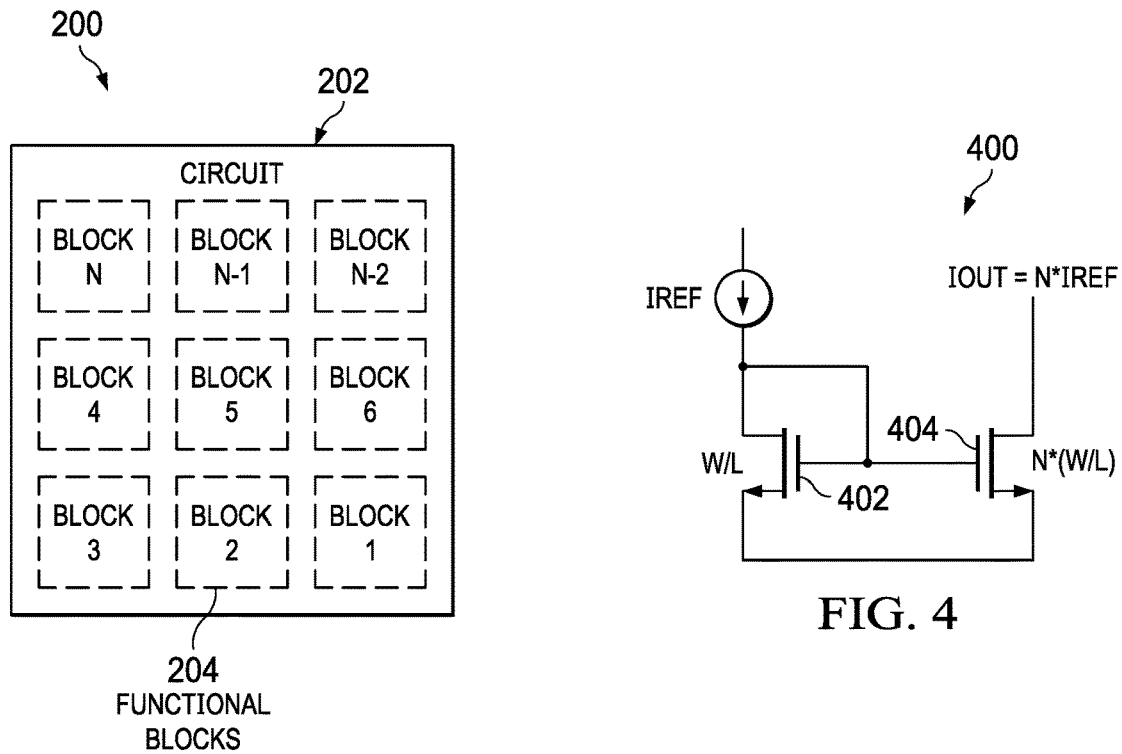
FIG. 2
FIG. 4

|  | $g_m$ | $g_{DS}$ | $V_{DSat}$ | $I_{dmm}$ | $V_{tmm}$ | ... |
|---|---|---|---|---|---|---|
| CURRENT MIRROR |  | X | X | X |  | ... |
| DIFFERENTIAL PAIR | X | X |  |  |  | ... |
| ... | ... | ... | ... | ... | ... | ... |

MULTI-ALGORITHMIC APPROACH TO REPRESENT HIGHLY NON-LINEAR HIGH DIMENSIONAL SPACE

CROSS-REFERENCE TO RELATED APPLICATIONS

This application claims priority to U.S. Provisional Application 63/037,385, filed Jun. 10, 2020, titled "Machine-Assisted Design for Product Design and Development," and U.S. Provisional Application 63/116,578, filed Nov. 20, 2020, titled "Automated Analog and Mixed-Signal Circuit Design and Validation," which are hereby incorporated by reference in its entirety.

BACKGROUND

Analog circuits are often used to sense, interact with, and/or control real-world signals. Real world signals or information are analog as they are a continuous quantity. For example, temperature varies across an infinite range (e.g., has infinite values) rather than just by discrete integer values. In comparison, digital circuits operate on discrete values, ones and zeros, which are used to represent analog signals or information. To help digital circuits handle analog signals or information, digital circuits can interact with or incorporate analog circuits. For example, a temperature sensor may include one or more analog circuits to sample a temperature, one or more hybrid circuits to convert the sampled temperature to a digital value, and one or more digital circuits to process the digital value. Similarly, a digital circuit may process an audio file, a hybrid circuit may perform a digital to analog conversion, an analog circuit may amplify the analog signal, and a speaker may output the actual sound encoded in the audio file. It may be understood that, as used herein, an analog circuit may refer to either analog or hybrid circuits (e.g., mixed signal circuits), which may include both analog and digital portions.

As integrated circuits advance, a number of components that can be fit in an area of a semiconductor die has increased rapidly. This reduction in size, also known as die shrink, helps reduce costs and improve performance of the resulting circuit chips. While, die shrinking and semiconductor scaling techniques are relatively straight forward for digital circuits, scaling analog circuits is much more difficult. For example, analog circuits may be more substantially affected by voltage headroom, gain degradation, signal to noise ratio adjustments, etc., as compared to digital circuits. Circuit geometry and configurations, in an analog or hybrid sub-circuit, such as a differential pair, may influence the performance of not only the differential pair, but may also influence the performance of other sub-circuits, such as a current mirror, in another part of the overall circuit. Additionally, different process nodes or semiconductor process technologies may influence how the circuit geometry and configuration affect the performance. Depending on the purpose of the overall circuit, this performance difference may be unacceptable. Scaling as between different sized process nodes may also affect sub-circuits differently such that each sub-circuit, or even individual components, may have a different scaling factor. Some analog circuits may need extensive manual changes or redesigns when attempting to scale a design between process nodes.

SUMMARY

This disclosure relates to techniques for designing circuits. More particularly, but not by way of limitation, aspects of the present disclosure relate a method including receiving a data object representing a circuit for a first process technology, the circuit including a first sub-circuit, the first sub-circuit including a first electrical component and a second electrical component, the first electrical component and the second electrical component arranged in a first topology, identifying the first sub-circuit in the data object by comparing the first topology to a stored topology, the stored topology associated with the first process technology, identifying sub-circuit physical parameter values associated with the first electrical component and the second electrical component of the first sub-circuit, determining a set of sub-circuit performance parameter values for the first sub-circuit based on a first machine learning (ML) model of the first sub-circuit and the identified sub-circuit physical parameters, converting the identified first sub-circuit to a second sub-circuit for a second process technology based on the determined set of sub-circuit performance parameter values, and outputting the second sub-circuit.

Another aspect of the present disclosure relates to a non-transitory program storage device including instructions stored thereon to cause one or more processors to receive a data object representing a circuit for a first process technology, the circuit including a first sub-circuit, the first sub-circuit including a first electrical component and a second electrical component, the first electrical component and the second electrical component arranged in a first topology, identify the first sub-circuit in the data object by comparing the first topology to a stored topology, the stored topology associated with the first process technology, identify sub-circuit physical parameter values associated with the first electrical component and the second electrical component of the first sub-circuit, determine a set of sub-circuit performance parameter values for the first sub-circuit based on a first machine learning (ML) model of the first sub-circuit and the identified sub-circuit physical parameters, convert the identified first sub-circuit to a second sub-circuit for a second process technology based on the determined set of sub-circuit performance parameter values, and output the converted first sub-circuit.

Another aspect of the present disclosure relates to an electronic device including a memory; and one or more processors operatively coupled to the memory, wherein the one or more processors are configured to execute instructions causing the one or more processors to receive a data object representing a circuit for a first process technology, the circuit including a first sub-circuit, the first sub-circuit including a first electrical component and a second electrical component, the first electrical component and the second electrical component arranged in a first topology, identify the first sub-circuit in the data object by comparing the first topology to a stored topology, the stored topology associated with the first process technology, identify sub-circuit physical parameter values associated with the first electrical component and the second electrical component of the first sub-circuit, determine a set of sub-circuit performance parameter values for the first sub-circuit based on a first machine learning (ML) model of the first sub-circuit and the identified sub-circuit physical parameters, convert the identified first sub-circuit to a second sub-circuit for a second process technology based on the determined set of sub-circuit performance parameter values, and output the converted first sub-circuit.

Another aspect of the present disclosure relates to a method comprising receiving a data object representing a circuit, the circuit including a sub-circuit, the sub-circuit including a first electrical component and a second electrical component, the first electrical component and the second electrical component arranged in a first topology, receiving a set of stored topologies, identifying the first electrical component, second electrical component, and connections of the first electrical component and second electrical component, determining, based on the connections of the first electrical component, a coupling between the first electrical component and a second electrical component, determining the first topology based on a comparison between the identified first electrical component, the identified second electrical component, the determined coupling between the first electrical component and the second electrical component, and topologies of the set of stored topologies, and outputting the identified first topology.

Another aspect of the present disclosure relates to a non-transitory program storage device comprising instructions stored thereon to cause one or more processors to receive a data object representing a circuit, the circuit including a sub-circuit, the sub-circuit including a first electrical component and a second electrical component, the first electrical component and the second electrical component arranged in a first topology, receive a set of stored topologies, identify the first electrical component, second electrical component, and connections of the first electrical component and second electrical component, determine, based on the connections of the first electrical component, a coupling between the first electrical component and a second electrical component, determine the first topology based on a comparison between the identified first electrical component, the identified second electrical component, the determined coupling between the first electrical component and the second electrical component, and topologies of the set of stored topologies, and output the identified first topology.

Another aspect of the present disclosure relates to an electronic device, comprising a memory, and one or more processors operatively coupled to the memory, wherein the one or more processors are configured to execute instructions causing the one or more processors to receive a data object representing a circuit, the circuit including a sub-circuit, the sub-circuit including a first electrical component and a second electrical component, the first electrical component and the second electrical component arranged in a first topology, receive a set of stored topologies, identify the first electrical component, second electrical component, and connections of the first electrical component and second electrical component, determine, based on the connections of the first electrical component, a coupling between the first electrical component and a second electrical component, determine the first topology based on a comparison between the identified first electrical component, the identified second electrical component, the determined coupling between the first electrical component and the second electrical component, and topologies of the set of stored topologies, and output the identified first topology.

Another aspect of the present disclosure relates to a method comprising receiving a data object representing a circuit for a process technology, the circuit including a first sub-circuit and the first sub-circuit including a first electrical component and a second electrical component, the first electrical component and the second electrical component arranged in a first topology, identifying the first sub-circuit in the circuit by comparing the first topology to a stored topology, the stored topology associated with the first process technology, identifying a first set of physical parameter values associated with first electrical component and the second electrical component of the first sub-circuit, determining a set of performance parameter values for the first sub-circuit based on a first machine learning (ML) model of the first sub-circuit and the identified set of physical parameter values, converting the identified first sub-circuit to a second sub-circuit for the process technology based on the determined set of performance parameter values, the second sub-circuit having a third electrical component and a fourth electrical component arranged in a second topology, and outputting the second sub-circuit.

Another aspect of the present disclosure relates to a non-transitory program storage device comprising instructions stored thereon to cause one or more processors to receive a data object representing a circuit for a process technology, the circuit including a first sub-circuit and the first sub-circuit including a first electrical component and a second electrical component, the first electrical component and the second electrical component arranged in a first topology, identify a type of the first sub-circuit based on connections of the first electrical component and the second electrical component, identify the first sub-circuit in the circuit by comparing the first topology to a stored topology, the stored topology associated with the first process technology, identify a first set of physical parameter values associated with first electrical component and the second electrical component of the first sub-circuit, determine a set of performance parameter values for the first sub-circuit based on a first machine learning (ML) model of the first sub-circuit and the identified set of physical parameter values, convert the identified first sub-circuit to a second sub-circuit for the process technology based on the determined set of performance parameter values, the second sub-circuit having a third electrical component and a fourth electrical component arranged in a second topology, and output the second sub-circuit.

Another aspect of the present disclosure relates to an electronic device, comprising a memory, and one or more processors operatively coupled to the memory, wherein the one or more processors are configured to execute instructions causing the one or more processors to receive a data object representing a circuit for a process technology, the circuit including a first sub-circuit and the first sub-circuit including a first electrical component and a second electrical component, the first electrical component and the second electrical component arranged in a first topology, identify a type of the first sub-circuit based on connections of the first electrical component and the second electrical component, identify the first sub-circuit in the circuit by comparing the first topology to a stored topology, the stored topology associated with the first process technology, identify a first set of physical parameter values associated with first electrical component and the second electrical component of the first sub-circuit, determine a set of performance parameter values for the first sub-circuit based on a first machine learning (ML) model of the first sub-circuit and the identified set of physical parameter values, convert the identified first sub-circuit to a second sub-circuit for the process technology based on the determined set of performance parameter values, the second sub-circuit having a third electrical component and a fourth electrical component arranged in a second topology, and output the second sub-circuit.

Another aspect of the present disclosure relates to a method comprising receiving an indication of a sub-circuit type and a set of sub-circuit performance parameter values, determining a sub-circuit topology based on the sub-circuit type and the set of sub-circuit performance parameters values, determining a set of sub-circuit physical parameter values based on a first machine learning (ML) model of the sub-circuit topology and the set of sub-circuit performance parameter values, generating a data object representing a sub-circuit based on the determined set of sub-circuit physical parameters values and the determined sub-circuit topology, and outputting the data object.

Another aspect of the present disclosure relates to a non-transitory program storage device comprising instructions stored thereon to cause one or more processors to receive an indication of a sub-circuit type and a set of sub-circuit performance parameter values, determine a sub-circuit topology based on the sub-circuit type and the set of sub-circuit performance parameters values, determine a set of sub-circuit physical parameter values based on a first machine learning (ML) model of the sub-circuit topology and the set of sub-circuit performance parameter values, generate a data object representing a sub-circuit based on the determined set of sub-circuit physical parameters values and the determined sub-circuit topology, and output the data object.

Another aspect of the present disclosure relates to an electronic device, comprising a memory, and one or more processors operatively coupled to the memory, wherein the one or more processors are configured to execute instructions causing the one or more processors to receive an indication of a sub-circuit type and a set of sub-circuit performance parameter values, determine a sub-circuit topology based on the sub-circuit type and the set of sub-circuit performance parameters values, determine a set of sub-circuit physical parameter values based on a first machine learning (ML) model of the sub-circuit topology and the set of sub-circuit performance parameter values, generate a data object representing a sub-circuit based on the determined set of sub-circuit physical parameters values and the determined sub-circuit topology, and output the data object.

Another aspect of the present disclosure relates to a method comprising receiving a first set of sub-circuit physical parameters for electrical components of a sub-circuit, and an indication of a first process technology, determining a first variation of sub-circuit physical parameters for the electrical components of the structural sub-circuit, the first variation including at least one sub-circuit physical parameter that vary from sub-circuit physical parameters of the first set of sub-circuit physical parameters, simulating the first variation of sub-circuit physical parameters in the first process technology to generate a first set of sub-circuit performance parameter values associated with the first variation, training a machine learning (ML) model of the structural sub-circuit based on a set of variations, the set of variations including the first variation and set of sub-circuit physical parameters associated with the first variation, for the first process technology, and storing the trained ML model.

Another aspect of the present disclosure relates to a non-transitory program storage device comprising instructions stored thereon to cause one or more processors to receive a first set of sub-circuit physical parameters for electrical components of a sub-circuit, and an indication of a first process technology, determine a first variation of sub-circuit physical parameters for the electrical components of the structural sub-circuit, the first variation including at least one sub-circuit physical parameter that vary from sub-circuit physical parameters of the first set of sub-circuit physical parameters, simulate the first variation of sub-circuit physical parameters in the first process technology to generate a first set of sub-circuit performance parameter values associated with the first variation, train a machine learning (ML) model of the structural sub-circuit based on a set of variations, the set of variations including the first variation and set of sub-circuit physical parameters associated with the first variation, for the first process technology, and store the trained ML model.

Another aspect of the present disclosure relates to an electronic device, comprising a memory, and one or more processors operatively coupled to the memory, wherein the one or more processors are configured to execute instructions causing the one or more processors to receive a first set of sub-circuit physical parameters for electrical components of a sub-circuit, and an indication of a first process technology, determine a first variation of sub-circuit physical parameters for the electrical components of the structural sub-circuit, the first variation including at least one sub-circuit physical parameter that vary from sub-circuit physical parameters of the first set of sub-circuit physical parameters, simulate the first variation of sub-circuit physical parameters in the first process technology to generate a first set of sub-circuit performance parameter values associated with the first variation, train a machine learning (ML) model of the structural sub-circuit based on a set of variations, the set of variations including the first variation and set of sub-circuit physical parameters associated with the first variation, for the first process technology, and store the trained ML model.

Another aspect of the present disclosure relates to a method comprising receiving an initial set of parameters, the initial set of parameters associated with a sub-circuit, interacting a first parameter of the initial set of parameters with other parameters of the initial set of parameters to generate a set of interacted parameters, adding the interacted parameters to the initial set parameters to generate a candidate set of parameters, performing a linear regression on parameters of the candidate set of parameters against a set of expected parameter values to determine a predictive value for parameters of the candidate set of parameters, removing parameters of the candidate set of parameters based on a comparison between the predicative value and a predetermined predictive threshold, determining an accuracy of the candidate set of parameters based on the linear regression, comparing the accuracy of the candidate set of parameters to a predetermined accuracy level, wherein if the accuracy of the candidate set of parameters reaches the predetermined accuracy level, outputting the candidate set of parameters, and wherein if the accuracy of the candidate set of parameters does not reached a predetermined accuracy level, repeating the steps of: interacting a second parameter of the initial set of parameters with other parameters of the candidate set of parameters, adding the interacted parameters to the candidate set of parameters, performing the linear regression, removing parameters, determining the accuracy, comparing the accuracy, until: the accuracy of the second candidate set of parameters has reached the predetermined accuracy, or each parameter of the initial set of parameters has been interacted with other parameters of the candidate set a predetermined number of times, and outputting the candidate set of parameters.

Another aspect of the present disclosure relates to a non-transitory program storage device comprising instructions stored thereon to cause one or more processors to receive an initial set of parameters, the initial set of parameters associated with a sub-circuit, interact a first parameter of the initial set of parameters with other parameters of the initial set of parameters to generate a set of interacted parameters, add the interacted parameters to the initial set parameters to generate a candidate set of parameters, perform a linear regression on parameters of the candidate set of parameters against a set of expected parameter values to determine a predictive value for parameters of the candidate set of parameters, remove parameters of the candidate set of parameters based on a comparison between the predicative value and a predetermined predictive threshold, determine an accuracy of the candidate set of parameters based on the linear regression, compare the accuracy of the candidate set of parameters to a predetermined accuracy level, wherein if the accuracy of the candidate set of parameters reaches the predetermined accuracy level, output the candidate set of parameters, and wherein if the accuracy of the candidate set of parameters does not reached a predetermined accuracy level, repeat the steps of: interact a second parameter of the initial set of parameters with other parameters of the candidate set of parameters, add the interacted parameters to the candidate set of parameters, perform the linear regression, remove parameters, determine the accuracy, compare the accuracy, until: the accuracy of the second candidate set of parameters has reached the predetermined accuracy, or each parameter of the initial set of parameters has been interacted with other parameters of the candidate set a predetermined number of times; and output the candidate set of parameters.

Another aspect of the present disclosure relates to an electronic device, comprising: a memory, and one or more processors operatively coupled to the memory, wherein the one or more processors are configured to execute instructions causing the one or more processors to receive an initial set of parameters, the initial set of parameters associated with a sub-circuit, interact a first parameter of the initial set of parameters with other parameters of the initial set of parameters to generate a set of interacted parameters, add the interacted parameters to the initial set parameters to generate a candidate set of parameters, perform a linear regression on parameters of the candidate set of parameters against a set of expected parameter values to determine a predictive value for parameters of the candidate set of parameters, remove parameters of the candidate set of parameters based on a comparison between the predicative value and a predetermined predictive threshold, determine an accuracy of the candidate set of parameters based on the linear regression, compare the accuracy of the candidate set of parameters to a predetermined accuracy level, wherein if the accuracy of the candidate set of parameters reaches the predetermined accuracy level, output the candidate set of parameters, and wherein if the accuracy of the candidate set of parameters does not reached a predetermined accuracy level, repeat the steps of: interact a second parameter of the initial set of parameters with other parameters of the candidate set of parameters, add the interacted parameters to the candidate set of parameters, perform the linear regression, remove parameters, determine the accuracy, compare the accuracy, until: the accuracy of the second candidate set of parameters has reached the predetermined accuracy, or each parameter of the initial set of parameters has been interacted with other parameters of the candidate set a predetermined number of times, and output the candidate set of parameters.

BRIEF DESCRIPTION OF THE DRAWINGS

For a detailed description of various examples, reference will now be made to the accompanying drawings in which:

FIG. 1 illustrates an example of circuit design evolution, in accordance with aspects of the present disclosure.

FIG. 2 is a block diagram of an analog circuit, in accordance with aspects of the present disclosure.

FIG. 4 is a circuit diagram illustrating a sub-circuit, in accordance with aspects of the present disclosure.

DETAILED DESCRIPTION

Figure 3A:
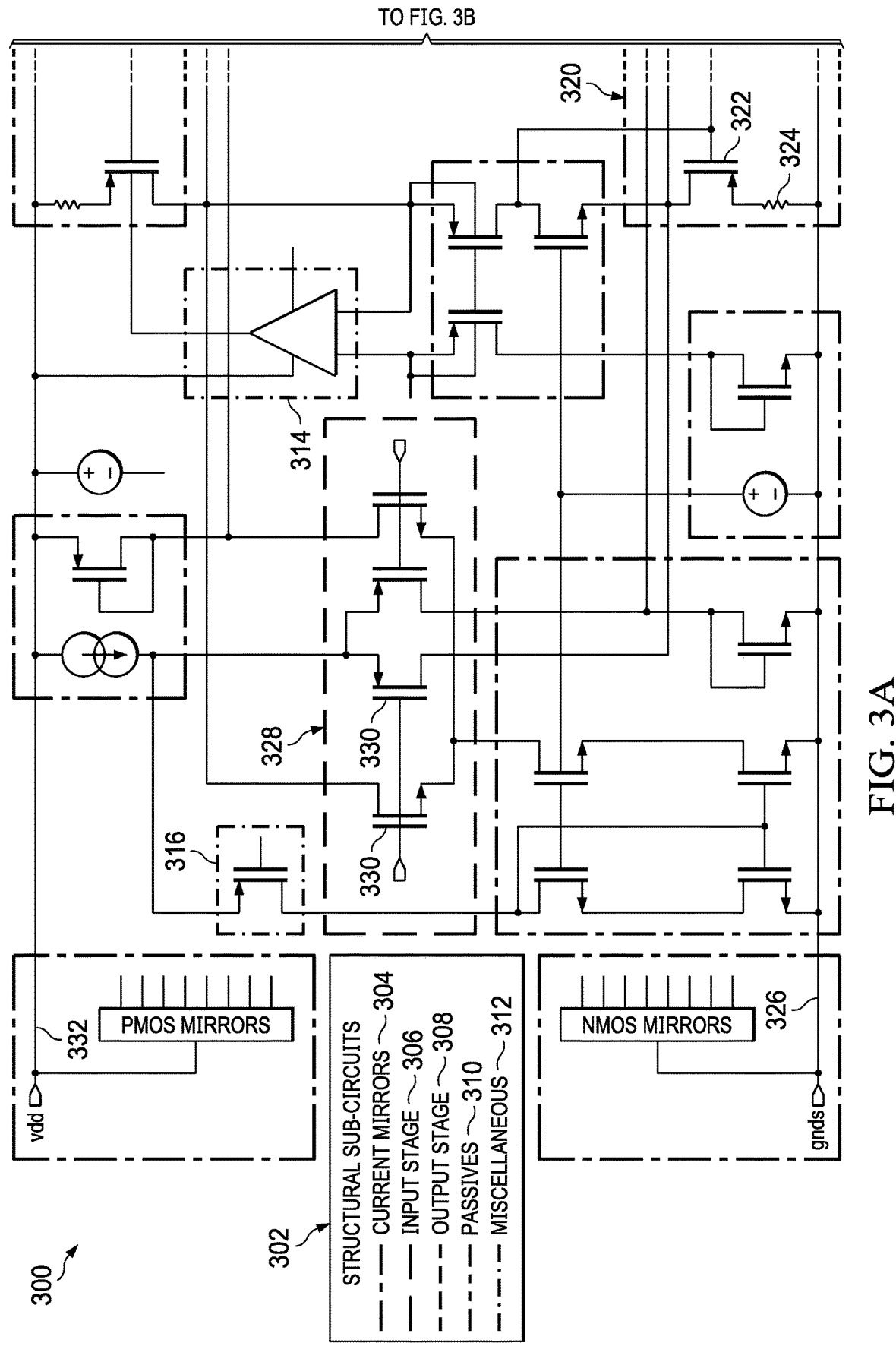
FIGS. 3A-3B are a circuit diagram of an illustrative circuit block, in accordance with aspects of the present disclosure.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

As digital circuits become ever more common in our lives, interfaces between these digital circuits and the real, analog world becomes ever more prevalent. As improved manufacturing process technologies for fabricating semiconductors are developed, digital circuit sizes have steadily shrunk, allowing digital circuits to take advantage of new, smaller, process technology nodes. Generally, process technology nodes refer to a size of a transistor gate length of a particular semiconductor manufacturing process technology. However, the pace at which analog circuits have been shrinking has not kept pace as analog circuits often require extensive redesign between different semiconductor manufacturing process technologies and/or process technology nodes (hereinafter referred to as process technology), rather than a relatively simple size shrink. Additionally, circuits may be modified to enhance functionality. For example, a circuit may be modified to adjust an operating voltage of the circuit to help reduce power requirements, or the circuit may be modified to expand an operating range for the circuit. For a particular process technology, aspects of each electrical component of the analog circuit and how the electrical component may interact with characteristics of the manufacturing process may influence the performance of the overall circuit in non-linear and difficult to predict ways. This makes simply resizing or copying a circuit from one process technology to another difficult. Similarly, these interactions make modifying the functionality of a circuit difficult to implement.

Manufacturing process technologies for fabricating semiconductors have evolved as digital and analog circuits have become more common. FIG. 1 illustrates an example 100 of circuit design evolution, in accordance with aspects of the present disclosure. In this example 100, a circuit 102 (individually, 102A, 102B, and 102C, and collectively 102), includes three sub-circuit blocks, such as bandgap 104 (individually, 104A, 1046, and 104C, and collectively 104), operational amplifier 106 (individually, 106A, 106B, and 106C, and collectively 106), and driver 108 (individually, 108A, 108B, and 108C, and collectively 108). In this example the circuit 102A may be currently implemented in a first process technology 110. The circuit 102 may be converted from the first process technology 110 to a second process technology 112 while maintaining the same overall operating specifications, such as an operating voltage. For example, in this case, the circuit 102 may be converted from the first process technology 110 to the second process technology 112 while maintaining a 3.3 v operating voltage.

Additionally, in certain cases, the circuit 102 may be redesigned, for example to enhance functionality. In this example, circuit 102B may be redesigned as circuit 102C to reduce the operating voltage while using the same process technology, here the second process technology 114. In certain cases, redesigning the circuit 102 may include updated design specifications, for example, of electrical devices of certain sub-circuit blocks, such as the operational amplifier 106C and the bandgap 104C. In other cases, re-architecting, for example to adjust a circuit layout, may be included, such as shown for the driver 108C.

Presently, modifying a circuit design or converting the circuit design from one process to another process technology is largely a manual process. For example, a circuit designer may have a set of design specifications that a circuit should meet. These design specifications may be based on expected performance of the circuit, so, for example, an amplifier circuit may have design specifications for output resistance, distortion, impedance, etc. The designer may then convert each electronic component of the circuit, taking into considering the physical parameters of the electronic component in the original process technology and determining physical parameters of the electronic components in the target process technology. This determination is largely based on experience and intuition. After the electronic components are converted to the target process technology, the completed circuit may be simulated on circuit simulation software, such as simulation program with integrated circuit emphasis (SPICE), as against the design specifications. If the converted circuit does not meet the design specifications, the circuit designer may adjust the circuit, such as by changing physical parameters of certain electronic components, and simulating the circuit again. This adjustment is also largely based on experience and intuition and is generally an iterative process. It may be understood that electrical components, as used herein, refers to components or devices which make up a circuit, such as transistors, resistors, capacitors, inductors, diodes, etc.

To help accelerate efforts to transition analog circuits from one process to the another, as well as the development of new and improved analog circuits, an implementation of an automated analog and mixed signal circuit design and validation is desired.

In certain cases, while a circuit may be presented visually, for example by a circuit design or simulation program, the underlying representation of the circuit may be in the form of one or more netlists or in a hardware description language (HDL). A netlist, or HDL, generally is a list of the electrical components of a circuit and a list of nodes each electronic component is connected with. In certain cases, attributes, structural information, physical parameters, or other information may also be included in the netlist. Moreover, in certain embodiments, the netlist or HDL is stored in a data object.

Sub-Circuits

FIG. 2 is a block diagram 200 of an analog circuit, in accordance with aspects of the present disclosure. Analog circuit 202 is any type of analog or hybrid analog-digital circuit that comprises a plurality of electrical components. In most embodiments, analog circuit 202 will process, generate, transmit, or receive an analog signal by one or more of the plurality of electrical components in the analog circuit 202. Analog circuit 202 may be a part of a larger circuit (e.g., an integrated circuit) or analog circuit 202 may be the entire circuit (e.g., an integrated circuit). Typically, the analog circuit 202 consists of one or more circuit blocks 204. Often, circuits are designed such that particular portions of the circuit perform certain tasks. For example, a circuit 202 may be divided into portions, or circuit blocks 204, which perform a particular function. Circuit blocks 204 may be any type of Intellectual Property ("IP") block, IP core, functional block, or collection of components. In certain embodiments, circuit block 204 is circuit 202. In addition, circuit blocks 204 may provide one or more functions for analog integrated circuit 202. In certain embodiments, circuit block 204 is analog integrated circuit 202. These circuit blocks 204 may be described, for example, in the netlist in a manner similar to software functions and referenced by, for example, another netlist or circuit block describing a larger portion of the circuit. In certain cases, circuit blocks 204 may include other circuit blocks.

Analog circuit 202 may comprise one or more sub-circuits, and circuit block 204 may also comprise one or more sub-circuits. In certain embodiments, a sub-circuit may be the same as circuit block 204 and/or analog circuit 202. In other embodiments, circuit block 204 may comprise a subset of the one or more sub-circuits of circuit block 204. A sub-circuit refers to a portion of a circuit that is less than the whole circuit (e.g., a subset of a circuit). In alternative embodiments, the sub-circuit may refer to the whole circuit.

A sub-circuit may comprise one or more of the plurality of electrical components in the analog circuit 202. Sub-circuits may be classified into sub-circuit types. A non-exhaustive list of sub-circuit types may include, but are not limited to a current mirror, a current divider, a current source, a current reference, a driver circuit, level-shift stage, gain stage, operational amplifier, a current mirror operational amplifier, inverting or non-inverting amplifier, a filter (e.g., a band pass filter, a low pass filter, or a high pass filter), an RC circuit, a resistor ladder, a voltage ladder, a power amplifier, a clock source, an analog-to-digital converter ("ADC"), a digital-to-analog converter ("DAC"), a voltage follower, a voltage regulator, a darlington transistor or pair, a boost circuit (e.g., step-up circuit), a buck circuit (e.g., a step-down circuit), a mixer, a modulator, an inverter, a signal conditioner, an integrator, a differentiator, an input stage, an output stage, or any other identifiable sub-circuit type used in analog circuits.

Figure 3B:
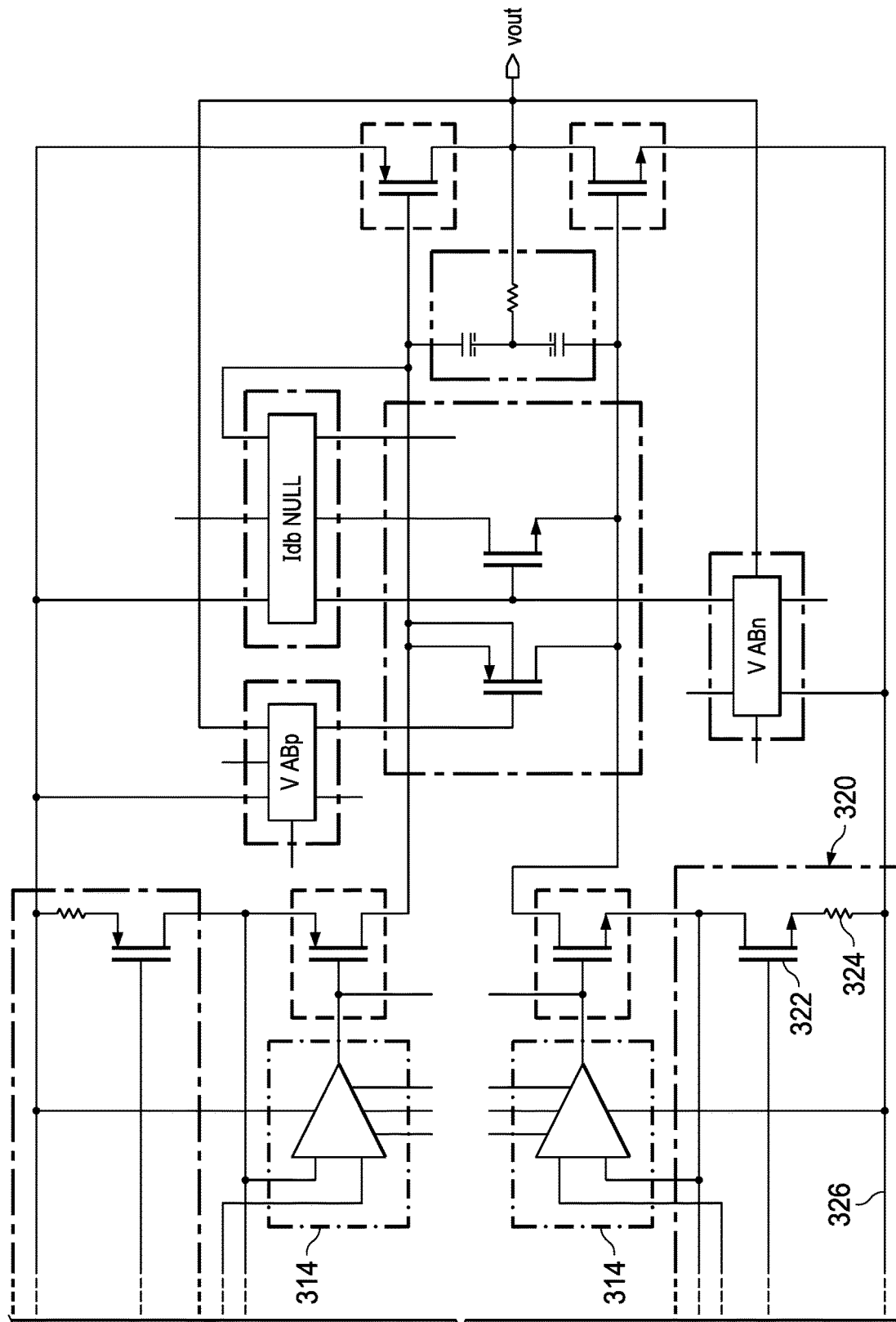

FIGS. 3A and 3B are a circuit diagram of an illustrative circuit block 300, in accordance with aspects of the present disclosure. As shown in FIGS. 3A and 3B, the circuit block 300 may be further divided into sub-circuits 302. In this example, circuit block 300 performs the function of amplifying a signal. Sub-circuits 302 are portions of the circuit block 300 intended to perform a purpose such as providing a reference voltage, copying a current, filtering a signal, etc. Sub-circuits 302 include a set of electrical components which are structured to operate together to perform the purpose and the set of electrical components may influence one or multiple output parameters of the circuit block. Sub-circuits may often function as building blocks of the overall circuit block, performing functions common across many circuit blocks. In certain cases, sub-circuits may be classified by their functions into types or categories. Classifying sub-circuits of a circuit block helps allow circuit blocks to be analyzed for conversion and/or creation at a sub-circuit level, helping to break down a circuit block into more easily analyzed components. Examples of sub-circuit types include current mirror 304, input stages 306, output stages 308, passives 310, voltage ladders, resistor ladders, etc. In certain cases, miscellaneous blocks 312 may also be identified for the circuit block. These miscellaneous blocks 312 may include, for example, nested circuit blocks 314, single electrical components 316 which may not have been included with other identified sub-circuits, unidentified sub-circuits which may need further analysis, etc.

FIG. 4 is a circuit diagram illustrating a sub-circuit 400, in accordance with aspects of the present disclosure. In this example, the sub-circuit 400 is a type of current mirror and includes two electrical components, a first transistor 402 and a second transistor 402. Each electrical component has certain physical parameters, which describe measurable physical characteristics about the electrical component, such as a channel width (W) and a channel length (L), input and output currents, impedance, operating region (e.g., conditions), N-type/P-type, etc. The sub-circuit physical parameters may refer to the physical parameters of electrical components of the sub-circuit and the sub-circuit physical parameters may also include operating information (e.g., operating point, bias point, quiescent point, Q-point, etc.). The operating point represents a current or voltage at the terminals of the electrical component for the electrical component to operate. Each electrical component may perform a particular role, for example, the current (IREF) that flows through the first transistor 404 is mirrored through the second transistor 402 as a function of the ratio (N) of the sizes of the transistors 402 and 404 and the first transistor 404 may act as a current to voltage convertor while the second transistor 402 may act as a voltage to current convertor. Based on the electrical components of the sub-circuit and their associated physical parameters, the overall sub-circuit may be associated with a variety of sub-circuit performance parameters. While a variety of sub-circuit performance parameters may be determined, not all sub-circuit performance parameters are important for a given sub-circuit type.

A sub-circuit may have a plurality of sub-circuit parameters. Sub-circuit parameters may comprise sub-circuit physical parameters of the sub-circuit, sub-circuit operational parameters of the sub-circuit, sub-circuit performance parameters of the sub-circuit, or a combination of physical parameters, operation parameters, and performance parameters of the sub-circuit. There may be a variety of sub-circuit parameters, which may describe how a particular sub-circuit performs in a variety of ways. The physical parameters of the electrical components and how electrical components of the sub-circuit are connected are factors which influence the sub-circuit parameters, but the relationship between these factors and the sub-circuit parameters are often non-linear and vary depending on the process technology. Sub-circuit parameters may be determined for a particular sub-circuit using circuit simulation software, such as SPICE simulation. For example, operating information of a sub-circuit may be determined using circuit simulation software. The operating information takes into account external influences to the circuit, for example, characteristics of a supply current and determines what the state (e.g., bias current) of electrical devices of the sub-circuit and/or circuit. In certain cases, determining operating information using circuit simulation software may be performed relatively quickly as compared to determining sub-circuit performance parameters of a sub-circuit using circuit simulation software.

Of the of sub-circuit parameters, a set of sub-circuit performance parameters may be identified as being more relevant to describing the performance of a particular sub-circuit with respect to physical parameters of electrical components of the sub-circuit. This set of sub-circuit performance parameters may be determined to be more relevant based on the function of the particular sub-circuit. In certain cases, sub-circuit performance parameters of the set of sub-circuit performance parameters included for a particular type of sub-circuit may be predetermined. In certain cases, this predetermination of the set of sub-circuit performance parameters for a particular type of sub-circuit may be made based on expert knowledge and/or experience as to what sub-circuit performance parameters are more relevant for the type of sub-circuit.

In certain cases, the sub-circuit performance parameters for a sub-circuit type may be predetermined algorithmically. For example, where a circuit including the sub-circuit type in question has been successfully converted from a first process technology to a second process technology, the sub-circuit type may be modeled, such as in circuit simulation software, as designed in the first process technology and modeled again as designed in the second process technology. A variety of sub-circuit performance parameters may be determined for both models and then compared to determine which performance parameters are most closely maintained after the conversion. This process may be repeated with multiple examples of the sub-circuit type, either in the same or different circuits, as well as with different topologies of the sub-circuit type to obtain a representative sample to determine the set of performance parameters that are most relevant for converting the sub-circuit type.

Sub-circuit performance parameters included in the set of sub-circuit performance parameters may differ for different types of sub-circuits as the purpose played by different types of sub-circuits are different. As an example, a set of sub-circuit performance parameters for current mirrors may include current matching, output impedance, operating region, and a width and length of the transistors. The sub-circuit performance parameters included in this set of sub-circuit performance parameters may differ from sub-circuit performance parameters included in another set of sub-circuit performance parameters associated with an input state sub-circuit type. In certain cases, if a set of sub-circuit performance parameters has not been defined for a particular sub-circuit type, performance parameters of the electrical components may be used instead of sub-circuit performance parameters.

Figure 5:
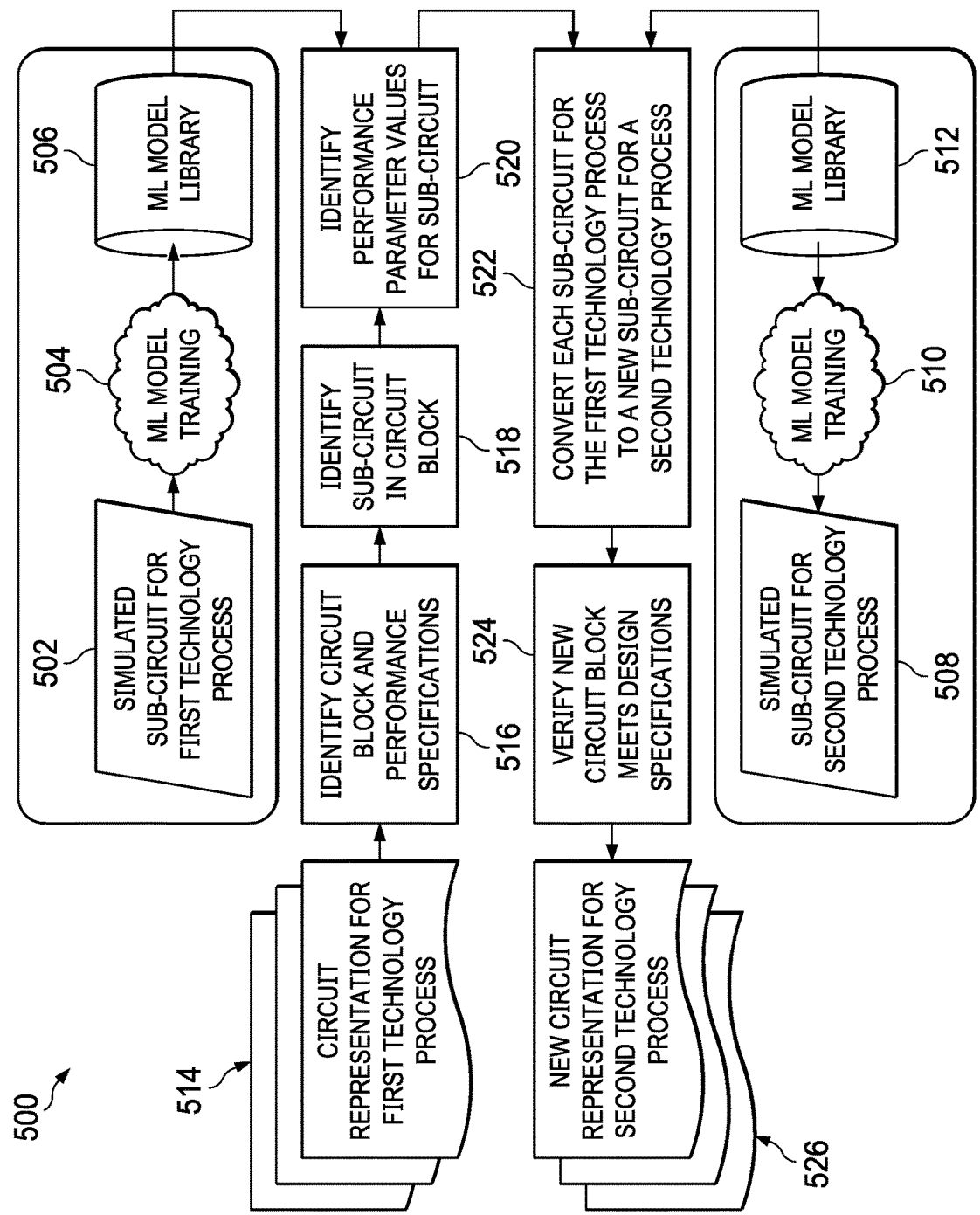
FIG. 5 is a block diagram of an example embodiment of a technique for automated analog and mixed signal circuit design and validation, in accordance with aspects of the present disclosure.

FIG. 5 is a block diagram 500 of an example embodiment of a technique for automated analog and mixed signal circuit design and validation, in accordance with aspects of the present disclosure. The example embodiment illustrated in block diagram 500 provides an overview of an exemplary technique for converting a circuit design from a first process technology to a second process technology, aspects of which are discussed in more detail below. An analog circuit may be divided into one or more circuit blocks. These circuit blocks are often designed to perform a certain function and comprise one or more sub-circuits. These sub-circuits include one or more electrical components which are structured to operate together, and a set of known sub-circuits may be identified. These known sub-circuits may be a number of arrangements of the electrical component (e.g., topologies) known to be sufficiently robust to be useable in a circuit for a process technology. Each component of a sub-circuit may be associated with certain range of physical parameters. Sets of sub-circuit physical parameters may be identified, each set having a different combination of physical parameters for the electrical components. These known sub-circuits may be modeled, for example as a netlist for use with a circuit simulator, for each set of sub-circuit physical parameters. This modeling may be based on a netlist, which generally is a list of the electrical components of a circuit and a list of nodes each electronic component is connected with. At block 502, models of these known sub-circuits may be simulated using circuit simulation software, such as SPICE. Each set of sub-circuit physical parameters may be simulated to identify certain sub-circuit performance parameters associated with a given set of sub-circuit physical parameters for the first process technology. A ML model for each sub-circuit of the known sub-circuits (or those sub-circuits supported by the particular embodiment) may be trained at block 504 to create a set of trained ML models for a process technology. In this embodiment, these trained ML models in the ML model library 506 may receive, as input, a set of sub-circuit physical parameters for electronic components of the sub-circuit for the first process technology and predict, as output, a set of sub-circuit performance parameters for the first process technology. These trained ML models may be stored in a ML model library 506. In certain cases, the ML model library 506 may be created once for a process technology and reused as needed.

Similarly, for a second process technology a set of trained ML models may be configured to receive, as input, a set of sub-circuit performance parameters and predict a set of sub-circuit physical parameters for electronic components of the sub-circuit. As described above, each component of a sub-circuit may be associated with certain range of physical parameters and sets of sub-circuit physical parameters may be identified, each set having a different combination of physical parameters for the electrical components. A set of known sub-circuits may be modeled, for example, as netlists, for each set of sub-circuit physical parameters. Each set of sub-circuit physical parameters may be simulated to identify certain sub-circuit performance parameters associated with a given set of sub-circuit physical parameters for the second process technology at block 508. At block 510, a ML model for each sub-circuit of the known sub-circuits (or those sub-circuits supported by the particular embodiment) may be trained to create a set of trained ML models for the second process technology. In this embodiment, these trained ML models in the ML model library 512 may receive, as input, a set of sub-circuit performance parameters for a second process technology and predict, as output, sub-circuit physical parameters for electronic components of the sub-circuit for the second process technology. This set of trained ML models maybe stored in the ML model library.

Thus, this example includes two sets of ML models. The first set of ML models take sub-circuit physical parameters for a first process technology and predicts certain sub-circuit performance parameters for a particular sub-circuit. The second set of ML models take the certain sub-circuit performance parameters for the particular sub-circuit and predict sub-circuit physical parameters for electrical components of the particular sub-circuit for the second process technology.

In this example, a representation 514 of a circuit, such as a netlist describing the circuit, may be parsed to identify one or more circuit blocks at block 516. A circuit block may be parsed to identify sub-circuits of the circuit block at block 518. A sub-circuit type may also be identified. At block 520 for each identified sub-circuit, sub-circuit physical parameters for components of the sub-circuit are identified and input to a ML model corresponding to the identified sub-circuit for the first process technology (e.g., stored in ML model library 506) to predict certain sub-circuit performance parameters. These predicted certain sub-circuit performance parameters are then input to a second ML model corresponding to the identified sub-circuit for the second process technology (e.g., stored in ML model library 512) to predict certain sub-circuit physical parameters for components of the sub-circuit in the second process technology. At block 522, a representation of the sub-circuit, such as a netlist, is created for each identified sub-circuit based on the predicted certain sub-circuit physical parameters for components of each sub-circuit and the sub-circuits may be connected into circuit blocks, which in turn are connected to form an overall circuit, thus converting the original circuit to a new circuit in the second process technology. At block 524, this new circuit may be simulated to verify that the new circuit meets the design specification, and if the design specifications are met, the representation of the new circuit may be output at block 526.

Figure 6:
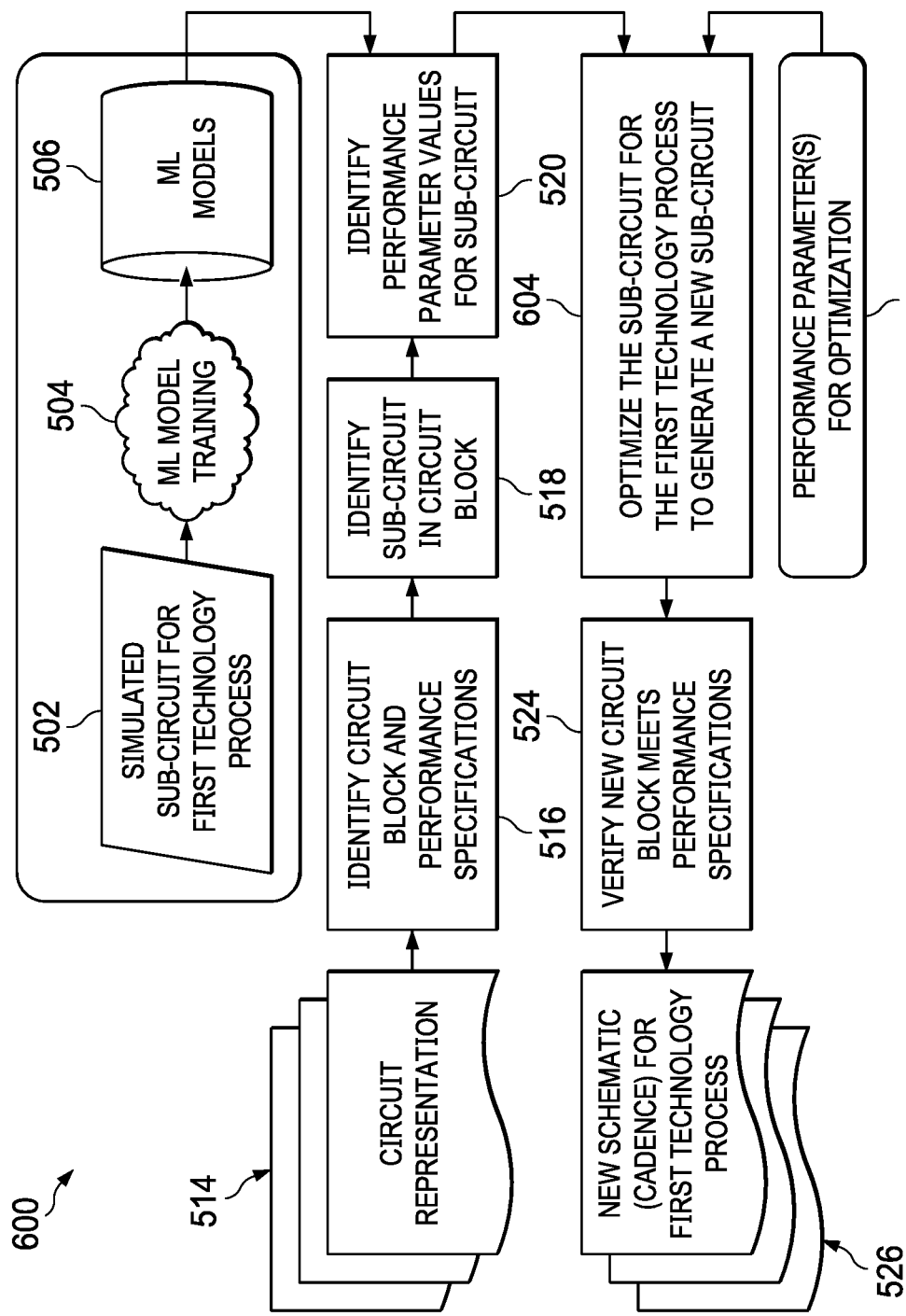
FIG. 6 is a block diagram of an example embodiment of a technique for automated analog and mixed signal circuit design and validation, in accordance with aspects of the present disclosure.

FIG. 6 is a block diagram 600 of an example embodiment of a technique for automated analog and mixed signal circuit design and validation, in accordance with aspects of the present disclosure. The example embodiment illustrated in block diagram 600 provides an overview of an exemplary technique to create a new circuit or optimize an existing circuit, aspects of which are discussed in more detail below. As discussed in conjunction with FIG. 5, analog circuits may be divided into circuit blocks and sub-circuits. Known sub-circuits may be modeled, for example as a netlist for use with a circuit simulator, for sets of sub-circuit physical parameters. At block 502, models of these models may be simulated using circuit simulation software, such as SPICE. Each set of sub-circuit physical parameters may be simulated to identify certain sub-circuit performance parameters associated with a given set of sub-circuit physical parameters for the first process technology. A ML model for each sub-circuit of the known sub-circuits (or those sub-circuits supported by the particular embodiment) may be trained at block 504 to create a set of trained ML models for a process technology. In this embodiment, certain trained ML models in the ML model library 506 may receive, as input, a set of sub-circuit physical parameters for electronic components of the sub-circuit for the first process technology and predict, as output, a set of sub-circuit performance parameters. Additionally, other trained ML models in the ML model library may receive, as input, sets of sub-circuit performance parameters for the first process technology and predict, as output, a set of sub-circuit physical parameters for electronic components of the sub-circuit for the first process technology. These trained ML models may be stored in a ML model library 506.

At block 516, a circuit block may be identified from a representation of a circuit 514. For example, an algorithm attempting to optimize an existing circuit may parse the representation of a circuit, for example stored as a data object such as a netlist, to identify a circuit block. As another example, a user attempting to create a new circuit may identify a circuit block 516 they are working on. At block 518, one or more sub-circuits of a circuit block may be identified. For example, an algorithm may parse a circuit block to identify sub-circuits of the circuit block. As another example, the user may identify a sub-circuit type that they are attempting to design. The user may alternatively or additionally identify other sub-circuits of the circuit block. At block 520, a set of performance parameter values for the sub-circuit may be identified. For example, an algorithm may, for each identified sub-circuit, identify sub-circuit physical parameters for components of the sub-circuit and input these sub-circuit physical parameters to a ML model corresponding to the identified sub-circuit for the first process technology (e.g., stored in ML model library 506) to predict a set of sub-circuit performance parameters. As another example, the user may identify certain sub-circuit performance parameters for the sub-circuit being created.

At block 602, one or more sub-circuit performance parameters may be provided for optimization. The one or sub-circuit more performance parameters for optimization may be provided along with the other sub-circuit performance parameters of the set of sub-circuit performance parameters. For example, an algorithm may optimize one or more sub-circuit performance parameters from the set of sub-circuit performance parameters identified at block 520 to help enhance the performance of the sub-circuit. Alternatively, the set of sub-circuit performance parameters identified at block 520 may be provided, for example, to attempt to optimize a topology of the sub-circuit. As another example, a user may provide the set of sub-circuit performance parameters and identified sub-circuit type for the sub-circuit being created. In certain cases, an indication of a sub-circuit type and/or sub-circuit topology may also be provided. Alternatively, the sub-circuit type may be inferred, for example, based on the sub-circuit performance parameters included in the set of performance parameters. In yet other cases, the sub-circuit may be optimized based on properties of the components within the topologies, for example, such as based on size or number of components within topologies of the sub-circuit type.

Figure 7A:
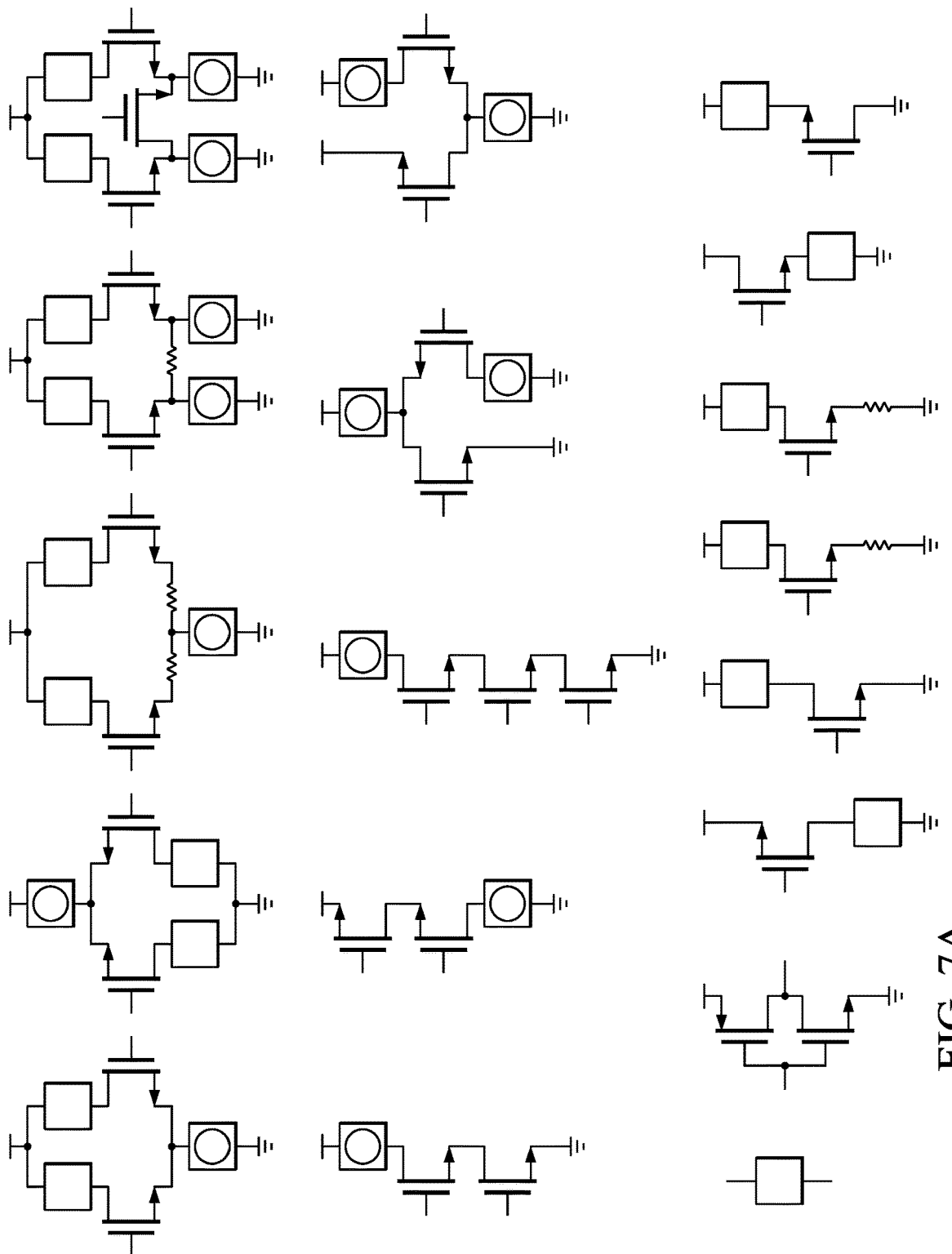
FIGS. 7A-7B illustrate an example set of known topologies of input or gain stage for a given process technology, in accordance with aspects of the present disclosure.
Figure 7B:
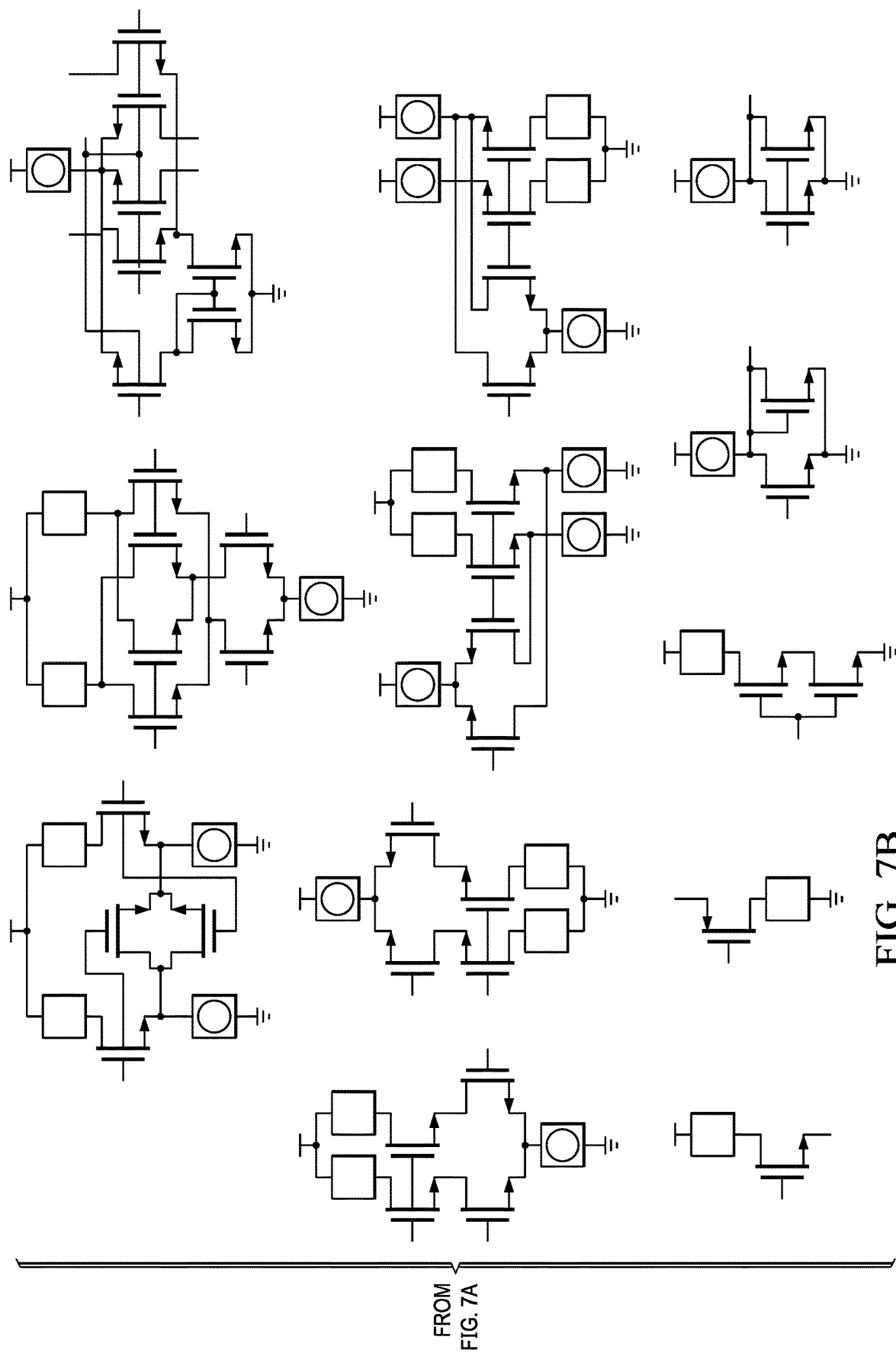

The topology of a sub-circuit refers to a specific arrangement of electrical components of a sub-circuit. For a sub-circuit type, there may be many practical topologies for implementing the sub-circuit. For example, FIGS. 7A-7B illustrates a set of different topologies for an input (or gain) stage sub-circuit type.

At block 604 an optimized sub-circuit may be identified. For example, based on the sub-circuit topology and optimized sub-circuit performance parameters, new sub-circuit physical parameters may be determined for electrical components of the sub-circuit by selecting an appropriate ML model based on the sub-circuit topology and inputting the optimized sub-circuit performance parameters to the ML model to obtain new sub-circuit physical parameters for the sub-circuit topology. In certain cases, the sub-circuit topology of the optimized sub-circuit may be the same as the original sub-circuit topology. In other cases, the sub-circuit topology may be optimized. For example, the optimized sub-circuit performance parameters may be input into multiple ML models of the sub-circuit type to generate multiple sets of sub-circuit physical parameters for multiple sub-circuit topologies of the sub-circuit type. A sub-circuit topology of the multiple sub-circuit topologies may then be selected by an optimization function. The optimization function may be any known optimization technique, such as cost function, loss function, etc. As an example, the optimization function may select a sub-circuit topology based on a least number of electrical components with sub-circuit physical parameters of those electrical components within a certain range, the range selected for ease of manufacture based on the first process technology. At block 524, this new optimized circuit may be simulated to verify that the new circuit meets the design specification, and if the design specifications are met, the representation of the new circuit may be output at block 526.

In certain cases, one or more known sub-circuits may be identified. While there may be multiple ways to design a particular set of electrical components to perform the specific purpose of a sub-circuit, in practice, there may be a limited number of practical electrical component arrangements (e.g., topologies) sufficiently robust to be useable for expected environmental conditions (e.g., temperature range, humidity range, operating voltage, etc.) for a given process technology. For example, FIGS. 7A-7B illustrate an example set 700 of known topologies of input or gain stage for a given process technology, in accordance with aspects of the present disclosure. Of note, the set 700 of known topologies is not exhaustive. Rather, the set 700 may include topologies known to be workable and/or practically useable. In certain cases, the set 700 of known topologies for a particular sub-circuit may be predetermined, at least in part, based on expert knowledge and/or experience as to what topologies are workable and/or practically useable.

In certain cases, the set 700 of known topologies may not be fixed and additional topologies may be added as needed. For example, as additional topologies are identified, these additional topologies may be added manually. In other cases, additional topologies may be identified, for example, by noting components and their connections of a new topology candidate that are not identified as a part of a known topology and matching this new topology candidate against a listing of other topology candidates previously not recognized as a part of a known topology. If there is a match, these candidate topologies may be surfaced to a user. Alternatively, a set of sub-circuit performance parameters may be algorithmically determined for the candidate topology, as described above. If the set of sub-circuit performance parameters matches the set of sub-circuit performance parameters for the corresponding type of sub-circuit, the candidate topology may be added to the set 700 of known topologies. In certain cases, sets of known topologies may be organized based on different types of sub-circuits, or a single set of known sub-circuits may include topologies for all of the types of sub-circuits.

Sub-Circuit Identification

Figure 8:
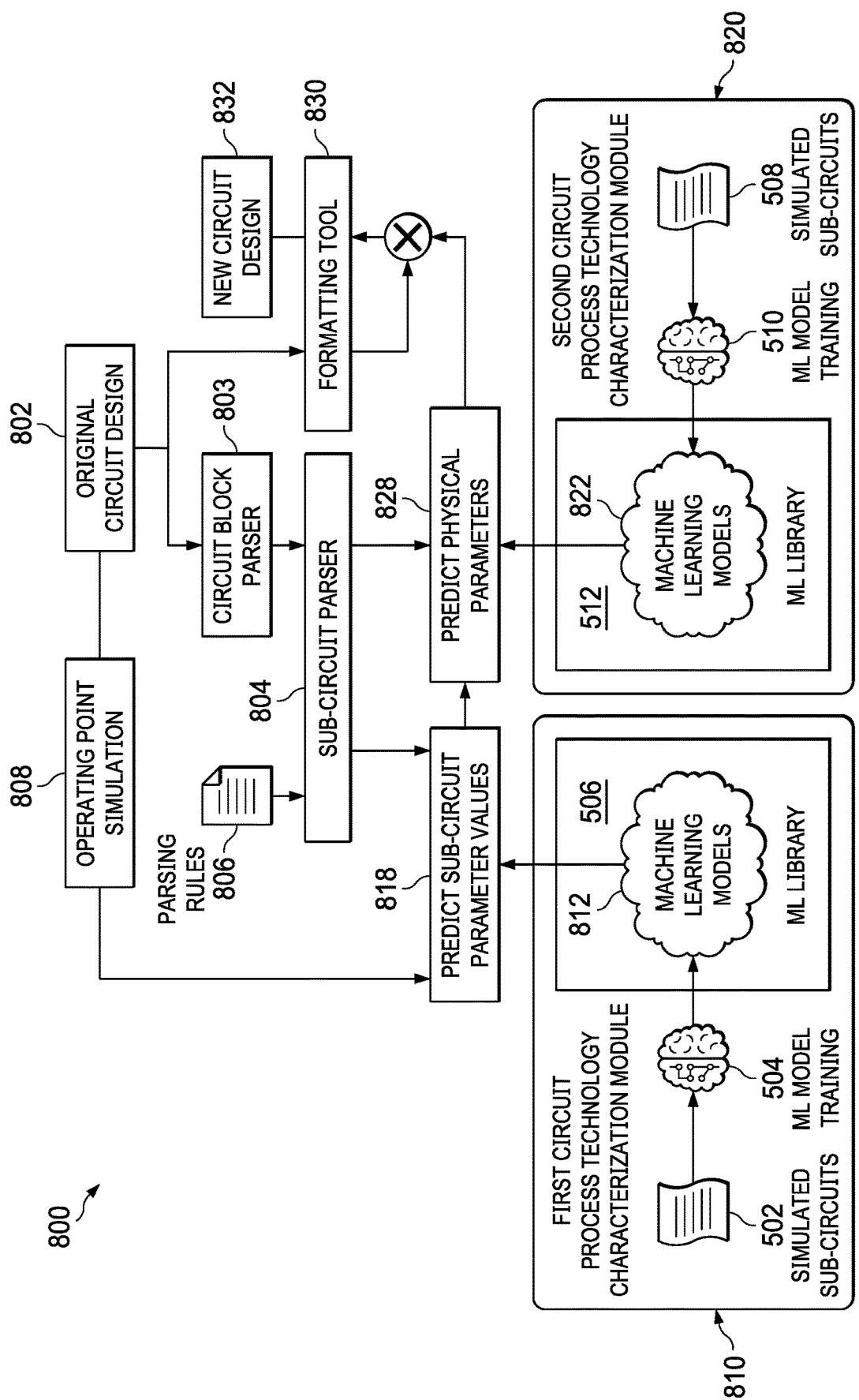
FIG. 8 is a system diagram illustrating an overview of technique for designing a new analog circuit from an original analog circuit, in accordance with aspects of the present disclosure.

FIG. 8 is a system diagram illustrating an overview of technique 800 for designing a new analog circuit from an original analog circuit, in accordance with aspects of the present disclosure. In certain cases, technique 800 may be implemented in software as one or more software programs which may include various modules. While technique 800 is described in the context of an embodiment organized with multiple modules, rules, tools, libraries, etc., it may be understood that this organization has been chosen for clarity and other embodiments may perform the techniques described in technique 800 using differing organizations. In technique 800, an existing analog circuit is described by a first data object representing an original circuit 802. A data object may be a location or region of storage or memory that contains value or group of values. A data object may include an electronic file in a file system, a block storage, or any other type of electronic storage that can store data. The original circuit may be a schematic, an electrical diagram, netlist, HDL, or any type of representation or design of a circuit (e.g., circuit design). In addition, the original circuit may be a subset of a larger circuit (e.g., an integrated circuit). The first data object representing the original circuit 802 may be any type of electronic representation or circuit design of a circuit. The first data object representing the original circuit 802 may be associated with a first process technology, such as a current circuit manufacturing process. An indication of the current circuit manufacturing process may be obtained in any way. For example, the indication may be input by a user and/or extracted from the first data object. In certain embodiments, technique 800 may identify the first process technology from the first data object representing an original circuit 802, a circuit design associated with the circuit, a circuit block in the original circuit, a sub-circuit in the original circuit, or one or more electrical components in the original circuit.

The first data object representing the original circuit 802 may include a representation of electrical components and the interconnections between the electrical components. Accordingly, first data object representing the original circuit 802 describes how this circuit is designed in the current process technology. In certain cases, the first data object representing the original circuit 802 may be described as one or more netlists, HDL, or any other electronic representation of a circuit. A netlist is an electronic representation of electrical components in a circuit and the connection between the electrical components in the circuit. In certain embodiments, the netlist may also include nodes that represent the connection between a first electrical component and a second electrical component in the circuit. The netlist may include multiple circuit blocks and may organize the circuit by each circuit block. In certain cases, the netlist, and corresponding circuit blocks, may be organized into portions that perform a particular task or function. In some embodiments, technique 800 may include a component that identifies circuit blocks in the first data object representing the original circuit 802. A circuit block parser 803 may parse the first data object to identify individual circuit blocks. A circuit block may be further parsed by a sub-circuit parser 804 to identify sub-circuits of the circuit block based on a set of sub-circuit parsing rules 806. In other embodiments, technique 800 may identify sub-circuits using the original circuit represented by the first data object. In certain embodiments, the original circuit in the first data object representing 802 is a circuit block.

The sub-circuit parsing rules 806 may be based, at least in part, on the electrical components of the sub-circuit, physical parameters of the electrical components, how the electrical components of the sub-circuit are connected, what purpose the electrical components serve, what other sub-circuits or electrical components that the identified sub-circuit is connected to, etc. In certain cases, the sub-circuit parsing rules 806 may first attempt to identify a sub-circuit based on the electrical components and connections of the electrical components. In the netlist, each electrical component is identified by type (e.g., a transistor (such as an NMOS transistor or PMOS transistor), capacitor, resistor, inductor, or any type of electrical component or device) and connections (e.g., coupling) of the electrical component are provided. The parsing rules 806 may, for example, parse the netlist to group a first electrical component with one or more other electrical components that the first electrical component is connected to, and attempt to match this group of electrical components as against a set of known topologies, an example of which is shown in FIGS. 7A-7B. As an example, the rules may indicate that if a certain electrical component is a transistor with a source connected to a certain electrical component or sub-circuit, a drain connected to another certain electrical component or sub-circuit, and a gate connected to another transistor, the other transistor having certain connection, then this certain set of electrical component is a particular topology of an input or gain stage. In certain cases, a role (e.g., branch, diode connected, gain stage, cascade stage, etc.) and physical parameters (e.g., width (W), length (L), W/L ratio, etc.) of the electrical components may also be considered and recorded. For example, a current mirror sub-circuit block may include a first transistor which is diode connected and a slave current source second transistor. Although both the first and second transistors belong to the same sub-circuit block, the first and second transistors may play different roles in the sub-circuit blocks, may have different electrical component parameters, and may influence performance parameters of the structural block in different ways. The parsing may be repeated with additional other electrical components until either only one or no matching known topology is left. If only one matching topology is left, then the sub-circuit can be identified based on the matching topology. If no matching topology is left, then the last additional other electrical component added may be dropped. By dropping this last additional other electrical component, multiple matching known topologies may be left, and conflict resolution may be performed to determine which known topology of the multiple matching known topologies is a best match. In certain embodiments, the netlist may identify one or more sub-circuits, and sub-circuit parsing rules may identify the sub-circuit using the identification of the sub-circuit by the netlist.

Conflict resolution may take into account the electrical components of the group of electrical components as well as one or more connections (e.g., inputs and outputs) of the group of electrical components. In certain cases, the connections as between the electrical components of the sub-circuit may be considered and if a unique match still cannot be found, then connections as between electrical components of the sub-circuit and other sub-circuits and/or other electrical components may be considered as well. For example, referring to FIGS. 2A and 2B, current mirror 220 may be identified as a current mirror as it includes a pair of transistors 222, which are connected, via a pair of resistors 224, to ground 226. Similarly, input stage 228 also includes a pair of transistors 230 But here, the pair of transistors 230 are connected to power supply line VDD 232 via other electrical components, allowing the input stage 228 to be identified as an input stage. These one or more connections may be compared to connections of the multiple matching known topologies to identify the best matching known topology. In certain cases, if no matching known topology is found, the group of electrical components may be flagged for later review and/or the electrical components may be individually analyzed. In certain cases, rather than performing a sub-circuit identification, each electrical component may be individually identified based on connections to the electrical component as well as a role of the electrical component in a functional circuit block.

Sub-Circuit Performance Parameters

Figures 9, 10:
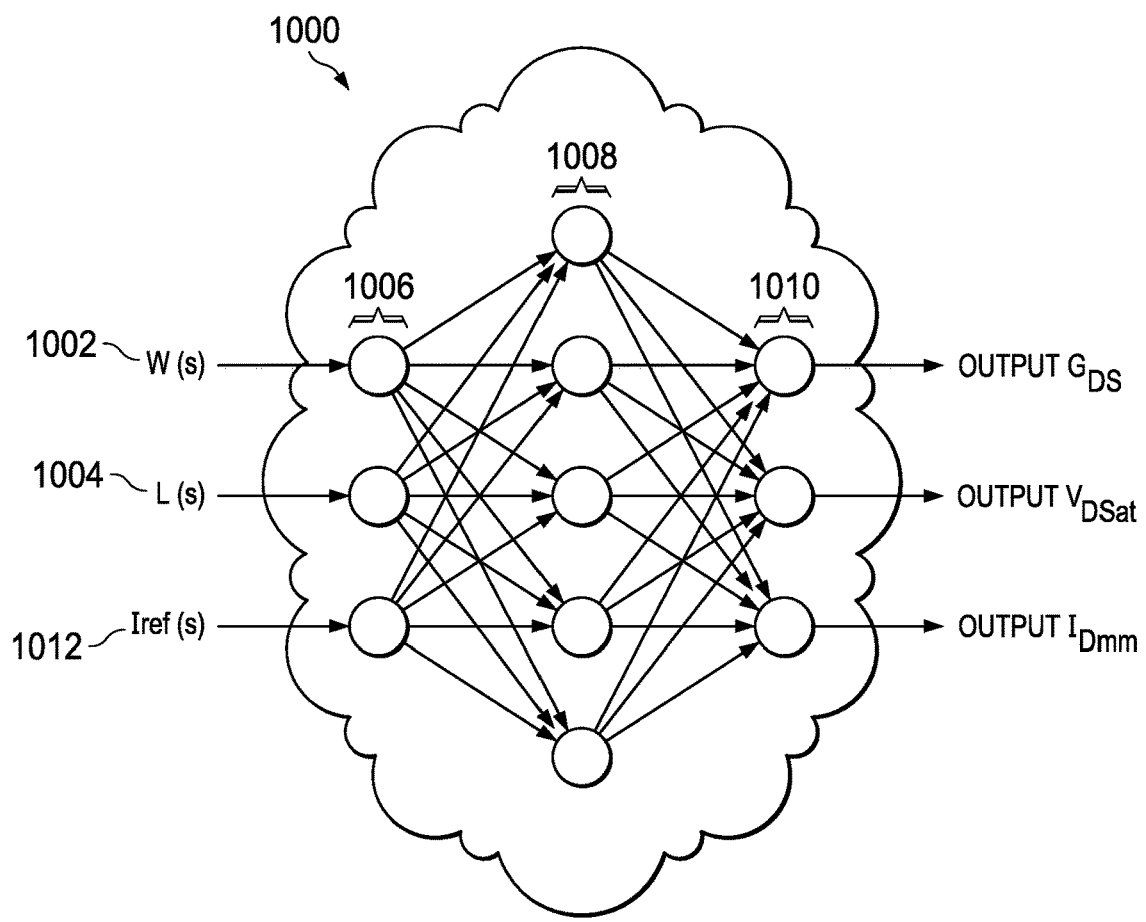
FIG. 9 is a chart illustrating sets of performance parameters for certain sub-circuits, in accordance with aspects of the present disclosure.
FIG. 10 illustrates an example neural network ML model, in accordance with aspects of the present disclosure.

Once a sub-circuit has been identified, a set of sub-circuit performance parameters may be determined based on the identification. In certain embodiments, the set of sub-circuit performance parameter may be determined based on the identified function of the sub-circuit, the circuit block, or the analog circuit. FIG. 9 is a chart illustrating sets of sub-circuit performance parameters for certain sub-circuits 900, in accordance with aspects of the present disclosure. How a sub-circuit performs may be described by numerous sub-circuit performance parameters, such as transconductance ($G_m$), channel conductance ($G_{DS}$), minimum drain to source voltage at which current saturates ($V_{DSat}$), drain current mismatch ($I_{dmm}$), threshold voltage mismatch ($V_{tmm}$), output impedance ($r_o$), voltage at a bulk substrate, voltage at a drain, etc. In certain cases, each type of sub-circuit may be associated with a set of sub-circuit performance parameters.

In certain embodiments, the sets of sub-circuit performance parameters may be defined per type of sub-circuit. Specific sub-circuit performance parameters included in the set of performance sub-circuit performance parameters may vary from one type of sub-circuit to another. Certain sub-circuit performance parameters 904 may be more relevant for a particular sub-circuit type than for another sub-circuit type. For example, while current mirrors may have a certain transconductance value, the transconductance value of a current mirror may be relatively less important to the function of current mirrors 902. Rather, sub-circuit performance parameters 904 more relevant to the function of current mirrors 902, such as channel conductance, minimum drain to source voltage at which current saturates, and $I_{dmm}$, may be included in the set of sub-circuit performance parameters for current mirrors. As another example, the set of sub-circuit performance parameters for a differential pair 906 may include the sub-circuit performance parameters 904 of transconductance ($G_m$), channel conductance ($G_{DS}$), and threshold voltage mismatch ($V_{tmm}$). The sub-circuit performance parameters of the set of sub-circuit performance parameters for a particular sub-circuit may be predetermined. In certain cases, the specific sub-circuit performance parameters of the set of sub-circuit performance parameters for a particular sub-circuit may be determined, at least in part, based on expert knowledge and/or experience. In other embodiments, the relevant sub-circuit performance parameters in the set of sub-circuit performance parameters are dynamically identified by the identified sub-circuit, the identified function of the sub-circuit, the circuit block, the function of the circuit block, the circuit, or the function of the circuit. In addition, the relevant sub-circuit performance parameters in the set of sub-circuit performance parameters for a type of sub-circuit may vary based on the identified sub-circuit.

Returning to FIG. 8, operating simulations 808 (e.g., operating point simulations) may be performed, in accordance with aspects of the present disclosure. For the operating simulations 808, the circuit, or portions thereof, may be simulated in circuit simulation software to determine sub-circuit operational parameters for one or more sub-circuits of the circuit. For example, a circuit block and/or sub-circuit of the original circuit 802 may be simulated in a circuit simulator, such as a SPICE simulator, to determine the sub-circuit operating point information for the sub-circuit. The sub-circuit operational parameters, which may include operating point information and bias point information, refers to a voltage or current (e.g., drain source voltage ($V_{DS}$), gate source voltage ($V_{gs}$), etc.) at a particular point of an electrical component with no input signal applied. In certain embodiments, operational parameters may include information or parameters corresponding to one or more operating points or bias points of an electrical component, a sub-circuit, a circuit block, or a circuit.

In certain cases, the operational parameters may be based on identified sub-circuits. For example, sub-circuit operational parameters may be generated for identified sub-circuits based on a simulation of the circuit block and/or the sub-circuit. In certain cases, the operational parameters may also be generated on an electrical component level. For example, if certain electrical components of the original circuit 808 were not included in an identified sub-circuit, operational parameters may be generated for the electrical component. In other cases where electrical components are identified, operational parameters may be generated for the electrical components of the original circuit 808. In certain cases, the operational parameters may be used, along with the sub-circuit physical parameters (obtained, for example, from the data object) and sub-circuit type information by a first process technology characterization module 810 to determine sub-circuit performance parameter values for the set of sub-circuit performance parameters associated with the identified sub-circuit or electrical component for the first process technology associated with the original circuit.

The first circuit process technology characterization module 810, in certain cases, creates, trains, stores, and provides machine learning models for predicting sub-circuit performance parameters based on operating information and sub-circuit physical parameters. The first process technology characterization module 810 may include trained machine learning (ML) models 812 in a ML library 506. In certain cases, there may be ML models corresponding to the known topologies that the technique 800 is configured to operate on. The trained ML model 812 may be stored and represented in a data object. The trained ML model 812 may be stored in the ML library 506. The ML library 506 may store and provide access to a plurality of ML models. In certain embodiments, the trained ML model 812 may be any set of rules, instructions, algorithms, or any type of data object that recognizes patterns.

A ML model 812 may be trained 504 based on a set of simulated sub-circuits 502. In certain cases, a ML model 812 may be trained based on variations of the sub-circuit for a first (e.g., source) process technology. For example, a first sub-circuit topology of the known sub-circuit topologies may be simulated 502 using a variety of sub-circuit physical parameters and operational parameters for the first process technology. This simulation may be performed using a circuit simulator, such as a SPICE simulation. The simulation generates a set of sub-circuit performance parameters corresponding to variants of the sub-circuit physical parameters and operational parameters for the first topology in the first technology process. The ML model for the first sub-circuit topology may then be trained 504 using the variants of the sub-circuit physical parameters and operational parameters to predict the corresponding sub-circuit performance parameter for that ML model for the first process technology. The simulated sub-circuits 502 and the results of the simulated sub-circuits 502 may be stored and represented in a data object.

In certain cases, the ML model 812 may be stored in a ML model library 506. The ML model 812 may use a variety of ML modeling techniques, including linear regression models, large margin classifiers (e.g., support vector machines), principal component analysis, tree-based techniques (e.g., random forest or gradient boosted trees), or neural networks. Linear regression models may be ML models which assumes a linear relationship between input parameters and output. Large margin classifiers may be ML models which returns a distance (e.g., margin) for an output is from a decision boundary. Support vector machines ML models plot data items in n-dimensional space based on the n features of the data input to find a hyperplane that differentiates the data items into different classes. Principal component analysis ML models create a matrix of how features of the data items relate and determine which features are more important. Random forest tree ML models create a large group of decision trees for a class prediction given a data item and generates a prediction from the group of decision trees. The prediction that is the most common in the group of decision trees is the class prediction. Gradient boosted tree ML models use a set of linked and layered decision trees where predictions are based on a weighted sum of predictions made by each layer of the group of decision trees. Neural network ML models use a set of linked and layered functions (e.g., node, neuron, etc.) which are weighted to evaluate input data. Neural network ML modeling techniques may include fully connected (where every neuron of a layer is connected to every other node of the layer), fully connected with regularization (where a regularization function is added to a fully connected neural network to help avoid over fitting), and fully connected with dropout (which removes nodes to simplify the network) and optimizers, such as adaptive moment estimation optimizer enhanced neural networks (which reduces data parameters of the network using gradient descent algorithms).

A particular type of sub-circuit implemented in a given process technology may be associated with a practical range of sub-circuit physical parameters (e.g., physical parameters) and operational parameters for the first process technology. The practical range of sub-circuit physical parameters may be provided, for example, by a user and the practical range may be based on limitations of a process technology. For example, a current mirror sub-circuit implemented in the first process technology may have a range of acceptable input reference currents (e.g., 10 nA-20 μA), a minimum and maximum transistor width (e.g., 1 μm-100 μm) and length (e.g., 0.1 μm-10 μm) for electrical components of the sub-circuit, etc. In other cases, the practical range of sub-circuits may be automatically determined, for example, by analyzing a range of parameters associated with a process technology or by simulating the circuit and/or sub-circuit across the range of parameters until the circuit and/or sub-circuit fails in the simulation, etc. A particular sub-circuit topology may then be simulated 502 across a selection of the practical range of sub-circuit physical parameters (e.g., physical parameters) and sub-circuit operational parameters to generate sub-circuit performance parameters (e.g., performance parameters) associated with the particular sub-circuit topology for the first process technology. For example, a particular circuit mirror topology, such as that shown in FIG. 4, may be simulated 502 with varying combinations of sub-circuit physical parameters and sub-circuit operational parameters, such as W/L of electrical components, input and output currents, impedance, operating region (e.g., conditions), N-type/P-type, etc. to generate sub-circuit performance parameters (e.g., performance parameters) associated with the respective physical parameters and respective sub-circuit operational parameters. The sub-circuit performance parameters include, but are not limited to those sub-circuit performance parameters discussed in conjunction with FIG. 9, such as transconductance ($G_m$), channel conductance ($G_{DS}$), minimum drain to source voltage at which current saturates ($V_{DSat}$), drain current mismatch ($I_{dmm}$), threshold voltage mismatch ($V_{tmm}$), output impedance ($r_o$), voltage at a bulk substrate, voltage at a drain, etc. In certain embodiments, the sub-circuit may be simulated using varying combinations of sub-circuit parameters (including physical parameters and performance parameters) and operational parameters to generate additional sub-circuit performance parameters. Moreover, in certain cases, the combinations of sub-circuit physical parameters, sub-circuit performance parameters, and sub-circuit operational parameters are not exhaustive, but rather combinations of the sub-circuit physical parameters, sub-circuit performance parameters, and sub-circuit operational parameters are selected and simulated to cover the Gaussian and Uniform distribution encompassing the cases typically identified in analog semiconductor technology manufacturing variations. For example, operating points may be selected substantially uniformly across the practical range of sub-circuit physical parameters with additional operating points selected in ranges of sub-circuit physical parameters most commonly used (or expected to be used) for a given sub-circuit or circuit.

In certain cases, the set of sub-circuit physical parameters, sub-circuit operational parameters, and generated sub-circuit performance parameters resulting from the simulations may be used to train a ML model 504 corresponding to the simulated sub-circuit topology.

Use of ML Models

A ML model for a particular sub-circuit topology in a particular process technology may be trained based on the sub-circuit physical and operational parameters, and corresponding generated sub-circuit performance parameters. As discussed above, multiple sets of sub-circuit physical parameters, operation parameters, and corresponding generated sub-circuit performance parameters are obtained across a practical range of sub-circuit physical parameters. These sets of parameters may be divided into a training set and a test set. The ML model 812 may be trained using the training set and the training 504 of the ML model 812 may be verified by the test set. To train the ML model 812, certain parameters may be provided as the input parameters to the ML model 812, the ML model 812 then makes certain predictions based on the input parameters, and these predictions are compared to the known correct output parameters found from the simulation. Based on this comparison, the ML model 812 may be adjusted, for example by adjusting node weights, to allow the ML model 812 to make predictions that closely match the known correct output parameters. The ML model training 504 may then be verified by using the ML model 812 to make predictions using the test set and then comparing the predictions output by the ML model 812 to the known correct output associated with the test set.

The sub-circuit parameters (including sub-circuit physical parameters, sub-circuit performance parameters, and sub-circuit operational parameters) for the particular sub-circuit topology may be used to train a ML model 812 for the particular sub-circuit topology for the first process technology. For example, the sub-circuit physical parameters and sub-circuit operational parameters from the simulated particular sub-circuit topology may be used as a training set to train a ML model 812 to predict certain sub-circuit performance parameters when presented with a set of sub-circuit physical parameters and sub-circuit operational parameters for the particular sub-circuit topology in the first process technology. This ML model 812 may be tested using the test set to verify the training. For example, sub-circuit physical parameters and operational parameters of the test set may be input to the ML model 812 to produce predicted sub-circuit performance parameters. These predicted sub-circuit performance parameters are then compared against the known sub-circuit performance parameters that were generated by simulating the sub-circuit using the associated sub-circuit physical parameters and operation parameters to verify that the ML model 812 is producing accurate predictions. Techniques for training the ML model 812 are discussed in greater detail below.

Once trained, this ML model 812 for the particular sub-circuit topology may be stored in the ML model library 506 along with other ML models for other sub-circuit topologies for the first process technology. In certain cases, the ML model library 506 may include trained ML models for identified sub-circuit topologies supported by an embodiment of technique 800.

Given sub-circuit operational parameters, along with sub-circuit physical parameters for an identified sub-circuit of the original circuit 802, the source circuit process technology characterization module 810 may locate the corresponding trained ML model 812 for the identified sub-circuit from the ML model library 506 and use the located ML model to predict certain sub-circuit performance parameters 818 for the identified sub-circuit.

In certain cases, a second process technology characterization module 820 is similar to the first process technology characterization module 810. For example, the second circuit process technology characterization module 820 may also include trained ML models 822 in a ML library 512. In certain cases, there may be ML models corresponding to the known topologies that the technique 800 is configured to operate on. The trained ML model 822 may be stored and represented in a data object. The trained ML model 822 may be stored in the ML library 512. The ML library 512 may store and provide access to a plurality of ML models. In certain embodiments, the trained ML models 822 may be any set of rules, instructions, algorithms, or any type of data object that recognizes patterns. It may be understood that the second circuit process technology characterization module may include ML models associated with any number of circuit process technologies. In certain cases, the second circuit process technology characterization module may include ML models associated with the first process technology, for example to help optimize a sub-circuit.

A ML model 822 may be trained 510 based on a set of simulated sub-circuits 508. In certain cases, the ML model 822, may be trained based on variations of a sub-circuit for a second (e.g., target) process technology. For example, the first sub-circuit topology of the known sub-circuit topologies may be simulated 508 using a variety of sub-circuit physical parameters and operational parameters for the second process technology. This simulation may be performed using a circuit simulator, such as a SPICE simulation. The simulation generates a set of sub-circuit performance parameters corresponding to each variant of the sub-circuit physical parameters and sub-circuit operational parameters for the first topology in the second process technology. The ML model 822 for the first sub-circuit topology may then be trained 510 using the variants of the sub-circuit physical parameters and operational parameters to predict the corresponding sub-circuit performance parameter for that ML model for the second process technology. The simulated sub-circuits 508 and the results of the simulated sub-circuits 508 may be stored and represented in a data object. It may be understood that for a given process technology multiple sets of sub-circuit physical parameters, sub-circuit operational parameters, and corresponding generated sub-circuit performance parameters are obtained across a practical range sub-circuit physical parameters and that the same multiple sets may be used for ML model training 504 or ML model training 510. In certain cases, the ML model 822 may be stored in a ML model library 512. The ML model 822 may also use a variety of ML modeling techniques, including linear regression models, large margin classifiers (e.g., support vector machines), principal component analysis, tree-based techniques (e.g., random forest or gradient boosted trees), or neural networks. A particular sub-circuit topology may be simulated 508 across a selection of the practical range of certain sub-circuit physical parameters and operational parameters to generate additional sub-circuit performance parameters associated with the particular sub-circuit topology for the second process technology. The practical range of sub-circuit physical parameters may be provided, for example, by a user and the practical range may be based on limitations of a process technology. For example, a particular circuit mirror topology, such as that shown in FIG. 3, may be simulated with varying combinations of sub-circuit physical parameters and sub-circuit operational parameters, such as W/L of electrical components, input and output currents, impedance, operating region (e.g., conditions), N-type/P-type, etc. to generate a set of sub-circuit performance parameters associated with the respective sub-circuit physical parameters (e.g., physical parameters and/or operational parameters) for the second process technology. In other cases, the practical range of sub-circuits may be automatically determined, for example, by analyzing a range of parameters associated with a process technology or by simulating the circuit and/or sub-circuit across the range of parameters until the circuit and/or sub-circuit fails in the simulation, etc. The sub-circuit physical parameters, operational parameters, and generated sub-circuit performance parameters resulting from the simulations for the particular sub-circuit topology may then be used to train a ML model 510 for the particular sub-circuit topology for the second process technology. For example, the sub-circuit physical parameters, sub-circuit operational parameters, and corresponding generated performance sub-circuit performance parameters resulting from the simulated circuit mirror topology may be used as a training set to train a ML model to predict sub-circuit physical parameters and sub-circuit operational parameters when presented with a set of sub-circuit performance parameters for the particular circuit mirror topology in the second process technology.

The ML model 822 may be trained using the training set and the training 510 of the ML model 822 may be verified by the test set. To train the ML model 822, certain parameters may be provided as the input parameters to the ML model 822, the ML model 822 then makes certain predictions based on the input parameters, and these predictions are compared to the known correct output parameters found from the simulation. Based on this comparison, the ML model 822 may be adjusted, for example by adjusting node weights, to allow the ML model 822 to make predictions that closely match the known correct output parameters. For example, after training, the ML model 812 may predict sub-circuit physical parameters and sub-circuit operational parameters when receiving a set of sub-circuit performance values for a circuit mirror topology in the second process technology.

This ML model may be tested using the test set to verify the training. The training 510 may be verified by using the ML model 822 to make predictions using the test set and then comparing the predictions output by the ML model 822 to the known correct output associated with the test set. For example, sub-circuit physical parameters and sub-circuit operational parameters of the test set may be input to the ML model to produce predicted sub-circuit performance parameters. These predicted sub-circuit performance parameters are then compared against the known sub-circuit performance parameters generated by simulating the sub-circuit using the associated sub-circuit physical parameters and sub-circuit operation parameters to verify that the ML model is producing accurate predictions.

Once trained, this ML model for the particular sub-circuit topology may be stored in the set of trained ML models 822 (e.g., another ML model library) along with other ML models for other sub-circuit topologies for the second process technology. In certain cases, the set of trained ML models 822 may include trained ML models for each identified sub-circuit. In certain cases, the model library 812 and another model library 822 may be combined into a single model library.

As indicated above, sub-circuit parameters (including sub-circuit physical parameters, sub-circuit performance parameters, and sub-circuit operational parameters) for a particular sub-circuit topology for the second process technology may be used to train ML model 822 for the particular sub-circuit topology for the second process technology. For example, certain sub-circuit performance parameters may be used as a training set to train a ML model 812 to predict certain other sub-circuit physical parameters and sub-circuit operational parameters. This ML model 812 may be tested using the test set to verify the training. For example, the predicted other sub-circuit physical parameters and sub-circuit operational parameters are then compared against the known sub-circuit physical parameters and operational parameters, used for simulating the sub-circuit to generate the sub-circuit performance parameters, to verify that the ML model 822 is producing accurate predictions of the particular sub-circuit topology. Once trained, the ML model 822 for the particular sub-circuit topology may be stored in the ML model library 512 along with other ML models for other sub-circuit topologies for the second process technology. In certain cases, the ML model library 512 may include trained ML models for identified sub-circuit topologies supported by an embodiment of technique 800.

Thus, given sub-circuit performance parameters for an identified sub-circuit of the original circuit, as represented by the data object 802, the second process technology characterization module 820 may locate the corresponding trained ML model 822 for the identified sub-circuit from the ML model library 512 and use the trained ML model 822 to predict 828 sub-circuit physical parameters and/or operational parameters for the identified sub-circuit. Once a set of sub-circuit physical parameters have been determined for the components of the identified sub-circuit, the data object representation of the identified sub-circuit is converted to the second process technology using the set of sub-circuit physical parameters for the corresponding components of the sub-circuit. For example, a netlist for the converted sub-circuit may be generated using the determined sub-circuit physical parameters.

Formatting tool 830 may correct formatting, connection drawing, and/or mapping issues that may arise during the conversion. In certain cases, the formatting tool 830 may extract certain formatting, connection, and or mapping information from the original circuit design 802 for use to correct the converted data object (e.g., netlist). In certain cases, this netlist may be connected to or appended on another netlist, such as a netlist for a converted version of the circuit block and other circuit blocks, if needed, to output a data object representing a new circuit 832 for the second process technology. In certain cases, the converted sub-circuit, converted circuit block, and/or new circuit in the data object representing the new circuit 832 may be simulated for example in a circuit simulator to verify that the performance of new circuit in the data object representing the new circuit 832 is within a certain range of performance of the original circuit 802. This range of performance may vary depending on the intended purpose of the new circuit 832 and this range of performance may be defined in a variety of ways, such as by a circuit designer, engineer, etc. As an example, a new control circuit may be tested to ensure that the new control circuit has an output voltage or current within a certain range, such as a percentage, of a target voltage/current for a given input setting.

As indicated above, the trained ML models may be stored in ML model libraries, for various process technologies. The ML model libraries may refer to any number of data structure, object, or process used to organize, store, and/or retrieve the ML model libraries from a non-transitory data storage medium. For example, ML library 506 and ML library 512 may be logical ML libraries within a single ML library (not shown) that includes a plurality of ML libraries associated with various process technologies. In certain cases, these ML model libraries may also be used as a part of designing new analog circuits. For example, an analog chip designer may want a particular sub-circuit with certain sub-circuit performance parameters. Rather than manually determining the physical parameters of each electrical component of the sub-circuit, a trained ML model corresponding to a particular topology of a sub-circuit may be selected from the ML model library. The sub-circuit performance parameters may be provided to the selected trained ML model and appropriate sub-circuit physical parameters determined by the selected trained ML model.

In certain cases, one or more techniques may be used to select the trained ML model from the ML model library. For example, as executing a trained ML model is often substantially quicker than training the ML model, a given set of sub-circuit performance parameters may be provided to any number of, or all, of the trained ML models of the ML model library corresponding to a selected sub-circuit type. A trained ML model corresponding to a certain topology for the selected sub-circuit may then be selected from the trained ML models that were capable of producing appropriate sub-circuit physical parameters. For example, the trained ML model selected may corresponding to the trained ML model with the fewest electrical components for the provided physical parameters. As another example, ML model libraries may be used to select a particular topology for a sub-circuit by providing appropriate sub-circuit parameters, such as sub-circuit performance parameters, to the ML model library (or logic associated with the ML model library). A sub-circuit type may be provided, or may be inferred based on, for example, specific sub-circuit performance parameters provided. Various (or all) ML models of different topologies associated with sub-circuit type may then be run using the provided sub-circuit performance parameters to determine a set of topologies of the sub-circuit type that may be appropriate for use. A specific topology of the sub-circuit type may then be selected from the set of topologies. In certain cases, this selection may be performed by a user. In some cases, one or more topologies for the sub-circuit type may be selected or suggested to the user. Topologies of the set of topologies for the sub-circuit may be analyzed, for example, based on complexity, a cost function associated with various physical parameters, overall size, etc., to provide the selection or suggestion.

In the example discussed above, physical parameters may be used by ML models of a first ML library 506 to predict sub-circuit performance parameters of a particular sub-circuit designed for a first process technology. These sub-circuit performance parameters may then be used by ML models of a second ML library 512 to generate sub-circuit physical parameters of the particular sub-circuit designed for a second process technology. Thus, each ML library is associated with a particular process technology. Using different ML libraries for each process technology helps enable various scenarios, such as conversions of a circuit from one process technology to another process technology, designing circuits with portions using one process technology and other portions using another process technology, searching across many process technologies to determine which process technology is most appropriate (e.g., in terms of cost, performance, etc.) for a particular circuit, etc. In certain cases, for example when such flexibility is not required, a single ML model which is trained to directly convert sub-circuit physical parameters of a sub-circuit in the first process technology to sub-circuit physical parameters of the sub-circuit in the second process technology may be used in place of the first and second ML models.

It may be understood that while discussed with respect to a sub-circuit, other sub-circuits, such as electrical components, may also be simulated across a range of sub-circuit physical parameters to predict similar sub-circuit performance parameters for training ML models for the sub-circuits.

Example ML Model

FIG. 10 illustrates an example neural network ML model 1000, in accordance with aspects of the present disclosure. In certain embodiments, modeling analog circuits with ML models can be performed by using sub-circuit parameters as input parameters (e.g., features) of a ML model. In alternative embodiments, modeling analog circuits with ML models can be performed using sub-circuit physical parameters as the parameters of a ML model. The example neural network ML model 1000 is a simplified example presented to help understand how such neural network ML model 1000 may be trained. It may be understood that each implementation of a ML model may be trained or tuned in a different way, depending on a variety of factors including, but not limited to, a type of ML model being used, parameters being used for the ML model, relationships as among the parameters, desired speed of training, etc. In this simplified example, sub-circuit physical parameters values of W and L are parameter inputs 1002 and 1004 to the ML model 1000.

Each layer (e.g., first layer 1006, second layer 1008, and third layer 1010) includes a plurality of nodes (e.g., neurons) and generally represents a set of operations performed on the parameters, such as a set of matrix multiplications. For example, each node represents a mathematical function that takes, as input (aside from the nodes of the first layer 1006), output from a previous layer and a weight. The weight is typically adjusted during ML model training and fixed after the ML model training. The specific mathematical function of the node can vary depending on ML model implementation. While the current example addresses three layers, in certain cases the ML model may include any number of layers. Generally, each layer transforms M number of input parameters to N number of output parameters. The parameter inputs to the first layer 1006 are output as input to the second layer 1008 with a set of connections. As each node of a layer (such as first layer 1006) outputs to each node in a subsequent layer (such as second layer 1008), ML model 1000 is a fully connected neural network. Other embodiments may utilize a partially connected neural network or another neural network design which may not connect each node of a layer to each node of a subsequent layer.

In this example, first layer 1006 represents a function based on a set of weights that are applied to the input parameters (e.g., input parameters 1002 and 1004) to generate output from first layer 1006 that is input to the second layer 1008. Different weights may be applied for the input received from each node of the previous layer by the subsequent layer. For example, for a node of the second layer 1008, the node applies weights to input received from nodes of the first layer 1006 and the node may apply a different weight to input received from each node of the first layer 1006. Nodes compute one or more functions based on the inputs received and corresponding weights and outputs a number. For example, the node may use a linear combination function which multiplies an input values from a node of the previous layer with a corresponding weight and sums across the results of the multiplication, coupled with a non-linear activation function which acts as a floor for the resulting number for output. It may be understood that any known weighted function may be applied by the node within the scope of this disclosure. This output number may be input to subsequent layers, or if the layer is a final layer, such as third layer 1010 in this example, the number may be output as a result (e.g., output parameter). In certain cases, the functions applied by nodes of a layer may differ as between layers. The weights applied by a node may be adjusted during training based on a loss function, which is a function that describes how accurately the predictions of the neural network are as compared to the expected results, an optimization algorithm, which helps determine weight settings adjustments based on the loss function, and a backpropagation of error algorithm, which applies the weight adjustments back through the layers of the neural network. Any optimization algorithm, (e.g., gradient descent, mini-batch gradient descent, stochastic gradient descent, adaptive optimizers, momentum, etc.), loss function (e.g., mean-squared error, cross-entropy, maximum likelihood, etc.), and backpropagation of error algorithm (e.g., static or recurrent backpropagation) may be used within the scope of this disclosure.

Certain ML models, such as a neural network, may include hyperparameters. Hyperparameters of the ML model may refer to parameters that control the operation of the ML model which cannot be derived through training, such as a number of nodes in a layer, number of layers, learning rate, etc.

Enhanced ML Modeling Techniques

As indicated above, as there may be multiple topologies for multiple types of sub-circuits, enhancing ML modeling techniques to efficiently generate ML models for these topologies and sub-circuits may be helpful. Generating ML models for analog and hybrid circuits which accurately predict parameters of these circuits can be challenging as analog and hybrid circuits can respond in highly non-linear ways as physical parameters of electrical components are varied. Additionally, modeling such behavior, for example as a neural network ML model, using current ML modeling techniques may require substantial training time and/or manual tuning of parameters of the model to achieve a desired accuracy. This in turn may make bulk generation of ML models challenging. To help streamline bulk ML model creation, ML model creation may be enhanced by including interaction parameters as input parameters in the ML model and performing dimensionality reduction on the input parameters using threshold stepwise selection.

In certain cases, properties of the process technologies may influence the behavior of the analog circuits. To help address this, one or more process technology parameters which describe the behavior of the process technology may be included as input parameters to the ML model. Examples of such process technology parameters may include oxide thickness, channel doping concentration, electron mobility, etc.

To further help address the non-linearities, parameter interactions, such as interaction parameter 1012, may be added as input parameters to the ML model 1000. Interaction parameters represent, for example, one or more functions which describe how different input parameters may interact together. For example, a function A*B may have input parameters A and B. An interaction parameter C could be created, where C=A*B, which would represent how the model responds to changes based on the multiplication of parameters A and B. As another example, an interaction parameter D could be created, where D=$\sqrt{AB}$, which represents how the model responds to changes based on the square root of the multiplication of parameters A and B. In certain cases, these interactions may be based on circuit theory equations. As an example, an input parameter to a ML model may be based on the equation for determining transconductance of a CMOS transistor. In this example, a ML model, $ML_{gm}$, may have input parameters such that $ML_{gm}$=f(W,L,T,NCH,$T_{ox}$, $I_D$, $I_{DS}$), where the input parameters respectively represent the electrical component width, electrical component length, temperature, N-channel doping concentration, oxide thickness, electrical component drain current bias, and the voltage across the drain-source terminals of the electrical component. One known nonlinear parameter interaction is the first order equation for transconductance, $g_m=\sqrt{2\mu_n C_{ox} W/L) I_D}$. The parameter interaction, $\sqrt{(W/L)I_D}$, may be determined from the input parameter data for W, L, and $I_D$, and provided as an input parameter, $f_i$, to the ML model as an input parameter such that $f_i=\sqrt{(W/L)I_D}$, and $ML_{gm}$=f(W,L,T,NCH,$T_{ox}$, $I_D$, $I_{DS}$, $f_i$). Adding the nonlinear interaction as an input to the ML model helps by preemptively providing known interactions which may help reduce an amount of training needed by the ML model.

In certain embodiments, attempting to characterize the non-linearities based on circuit theory, such as by including known circuit theory equations (e.g., the first order equation for transconductance), can introduce higher-order interaction terms and may increase the dimensionality (e.g., number of parameters input into the ML model). To help reduce the number of parameters for input into the ML model, dimensionality reduction may be performed. Dimensionality reduction removes parameters as inputs to the ML model if it is determined that those parameters do not impact the model behavior. Dimensionality reduction may help reduce the number of variables, identify an optimal set of parameters to be input into the ML model, and/or help reduce the processing time of the ML model. In certain cases, dimensionality reduction may be performed using threshold stepwise selection.

Threshold Stepwise Selection

Figure 11:
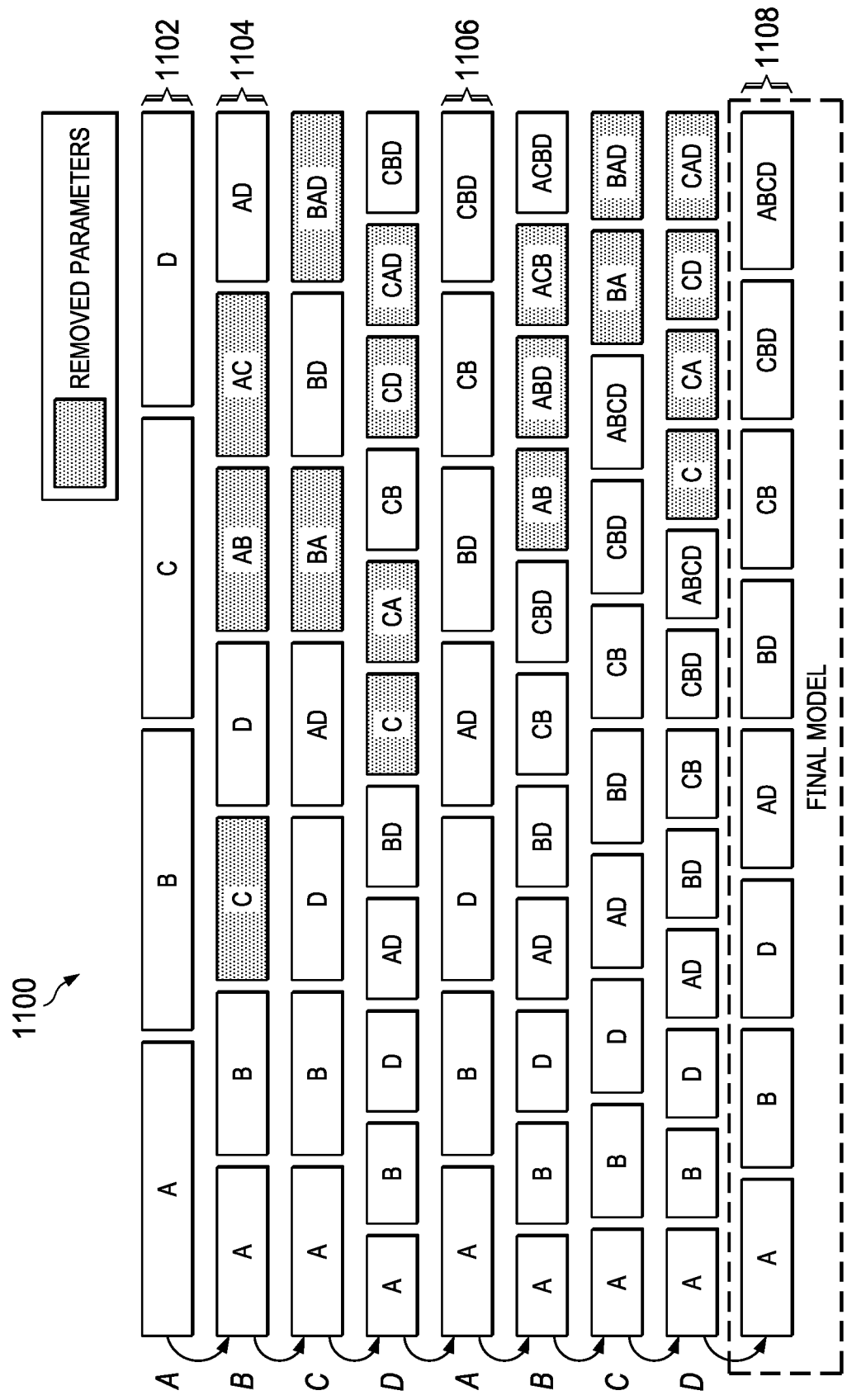
FIG. 11 illustrates a series of ML model parameters for threshold stepwise selection, in accordance with aspects of the present disclosure.

Threshold stepwise selection helps build higher order parameter interactions by iterating over the input parameter interactions in a stepwise fashion, determining the significance the parameter interactions have on the model behavior, and removing any parameter interactions that do not meet a threshold. In this manner, higher order interactions can be determined while minimizing the dimensionality of the ML model. FIG. 11 illustrates a series of ML model parameters for threshold stepwise selection 1100, in accordance with aspects of the present disclosure. Threshold stepwise selection begins with an initial set 1102 of parameters. In this example, variables A, B, C, and D, of the initial set 1102, represent generic input parameters to a ML model (e.g., sub-circuit physical parameters, sub-circuit performance parameters, constants, parameters descriptive of a process technology, etc.), such that a result of the ML model, R, is a function of A, B, C, and D: R=f (A, B, C, D). In certain cases, R may represent the expected results of the ML model, (e.g., sub-circuit physical parameters or sub-circuit performance parameters) of a sub-circuit being modeled by the ML model. The initial set 1102 of parameters may also include interaction parameters 1012. In a first step, a first parameter may be interacted with each of the other parameters to generate a second set 1104 of parameters. This interaction as between parameters may be based on the mathematical function of nodes in the ML model. For example, assuming generic parameter A represents input parameter 1002 and B represents input parameter 1004, of FIG. 10, then AB may represent an interaction corresponding to a function as applied in the second layer 1008 of ML model 1000 to input parameter 1002 and input parameter 1004, without the weight. Thus, higher order parameter values represent interaction values obtained from the component parameters. For example, assuming the interaction is multiplication, if A=2 and B=3, AB=6. If C=4, the ABC=24. If A is an equation, such as a known circuit theory equation, the equation may be evaluated to obtain a value and this value used for the interaction.

In this example, the parameter A is interacted with parameters B, C, and D to generate parameters AB, AC, and AD, as shown in the second set 1104 of parameters, such that R for the second set 1104 of parameters would correspond to R=f(A,B,C,D,AB,AC,AD). While parameter A is interacted in this example, it may be understood that any parameter of the initial set 1102 may be interacted with the other parameters of the first set 1102. In certain cases, the interaction may be based on mathematical functions applied as between parameters in a node of a neural network. A linear regression may then be performed on the parameters of the second set 1104. The linear regression is a linear function which attempts to model a relationship between the parameters of the second set 1104 and results of the linear regression may be compared to expected results of the ML model (e.g., as determined by a circuit simulation of the sub-circuit topology being modeled by the ML model). A statistical significance test (e.g., a null hypothesis test) may be used to determine a statistical significance value (e.g., a null hypothesis p-value) to predict each parameter's contribution of the second set 1104 of parameters to the linear regression results. The statistical significance value may then be compared against a defined threshold for the statistical significance value. The threshold for the statistical value may be determined as a fixed value as an input to the threshold stepwise selection algorithm, or the threshold may be determined through known techniques such as Bayesian hyperparameter optimization. Bayesian hyperparameter optimization is a technique for determining hyperparameters of a ML model. The hyperparameters of the ML model may refer to parameters that control the operation of the ML model which cannot be derived through training, such as a number of nodes in a layer, number of layers, learning rate, etc. In this example, the hyperparameter to be optimized may be the threshold for the statistical significance. In a third step, parameters that do not meet the threshold for statistical significance, in this example, parameters C, AB, and AC of the second set 1104 of parameters, may be discarded.

In a fourth step, the first through third steps may be repeated with each parameter of the initial set 1102 of parameters to obtain a fourth set 1110 of parameters. For example, a second parameter of the initial set 1102 may be interacted with parameters of the second set 1104 (without the parameters that did not meet the threshold for statistical significance). This interaction may be substantially similar to those interactions performed to generate the second set 1104 of parameters. A linear regression may be performed on parameters of a third set 1106 in substantially the same way as performed on parameters of the second set 1104, and parameters that do not meet the threshold for statistical significance, in this example, parameters BA and BAD of the third set 1106 of parameters, may be discarded. This interaction/linear regression/discarding parameters may be repeated for each parameter of the initial set 1102 to obtain resulting parameters of a round of stepwise threshold selection, such as the fourth set 1110 of parameters. In certain cases, this step iterates over all of the initial set 1102 of parameters even if subsequent steps have determined the parameter to not be significant in the modeling problem. Even though the parameter alone may not contribute to the model result, the parameter's interaction with other parameters may have significance. Including all of the initial set 1102 of parameters regardless of individual significance when looping through the interactions helps ensure that significant interactions of all parameters are not lost.

The resulting parameters in the fourth set 1110 may be compared to the expected results (e.g., obtained via circuit simulations) to determine an accuracy of the resulting parameters in the fourth set 1110. If the accuracy meets a threshold accuracy value, then the fourth set 1110 of parameters may be used as input parameters for the ML model for the sub-circuit. The threshold accuracy value may be determined in any way, for example, by experimentation, experience, etc.

In a fifth step, if the accuracy does not meet the threshold accuracy value, the first through fourth steps may be repeated by interacting the initial set 1102 of parameters and resulting parameters (such as parameters of the fourth set 1110) until the threshold accuracy value is met by resulting parameters from a round of threshold stepwise selection, such as a final set 1108 of parameters. Doing so may result in higher order interactions parameters such as interaction parameters CBD and ABCD of the final set 1108, in this example. In certain cases, a number of repetitions in this fifth step may be limited, for example based on a predetermined number of rounds, if accuracy of the resulting parameters stops increasing, if the parameters of the resulting parameters are unchanged, etc. Of note, in this example, higher order parameters may be represented by interaction parameters resulting from interacted parameters (e.g., parameters represented in FIG. 11 by multiple letters). As shown, threshold stepwise selection allows for higher order parameters to be developed while still limiting the total number of parameters through dimensionality reduction. The final set 1108 of parameters, as determined by the threshold stepwise selection step, represent the set of parameters that are most statistically significant for the sub-circuit being modeled. By using the parameters determined to be most statistically significant by the threshold stepwise selection step as a starting point (e.g., as initial parameters for input to the ML model), an amount of time needed to train the a ML model to obtain a certain level of accuracy may be reduced.

In certain cases, if the desired threshold accuracy value is not met by threshold stepwise selection, threshold stepwise selection may be applied in conjunction with stacked models to help improve accuracy. A stacked model uses information derived from an initial model, such as the final set 1108 of parameters output from threshold stepwise selection, as inputs to help guide subsequent modeling techniques. For example, if after applying a predetermined number of rounds of threshold stepwise selection, the desired threshold accuracy value is not met, the parameters selected during the last round of threshold stepwise selection may be used as used as input to a ML model, such as a neural network trained on the sub-circuit physical parameters and simulated sub-circuit performance parameters. This ML model may then be further tuned using any known ML tuning technique. For example, Bayesian hyperparameter optimization may also be applied to the ML model to tune the hyperparameters of the ML model. Bayesian hyperparameter optimization is a technique for determining hyperparameters of a ML model based on a probability model of how a hyperparameter influences the accuracy of the ML model as different hyperparameters are adjusted based on a validation score. The validation score may be determined by adjusting the hyperparameter of the ML model, training the ML model to generate predictions of the ML model with the adjusted hyperparameter, and evaluating these predictions against expected results to calculate the validation score.

Figure 12:
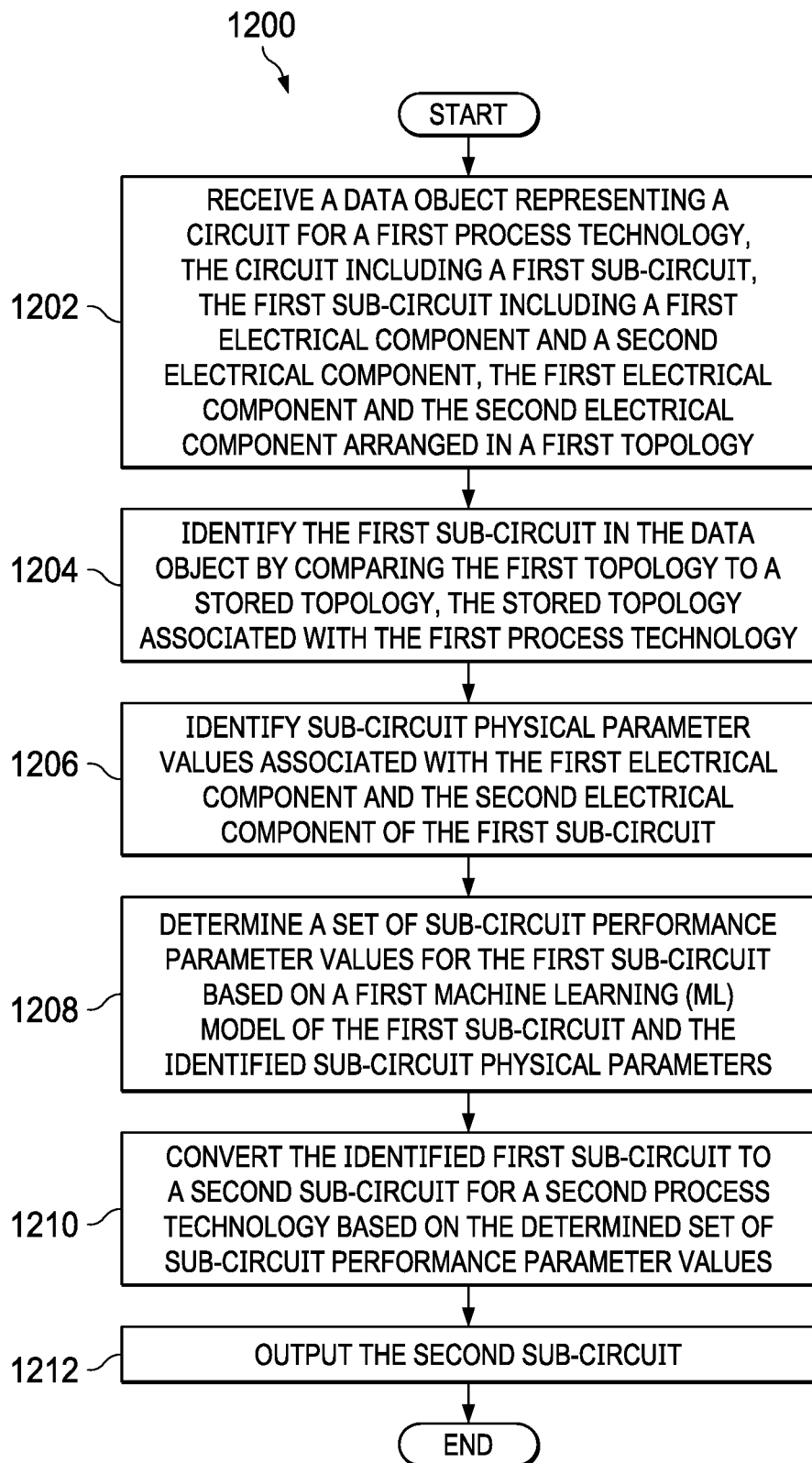
FIG. 12 is a flow diagram illustrating an overview of a technique for designing circuits, in accordance with aspects of the present disclosure.

FIG. 12 is a flow diagram illustrating an overview of a technique for designing analog circuits 1200, in accordance with aspects of the present disclosure. At block 1202, a data object representing a circuit for a first process technology may be received, the circuit including a first sub-circuit, the first sub-circuit including a first electrical component and a second electrical component, the first electrical component and the second electrical component arranged in a first topology. For example, the analog circuit may be described as a netlist, which is a list of electrical components and connections of those electrical components. At block 1204, the first sub-circuit may be identified in the data object by comparing the first topology to a stored topology, the stored topology associated with the first process technology. For example, the functional circuit block may be a portion of the analog circuit which represents a set of circuits that perform a function, such as amplifying a signal, comparing two signals, creating a clock signal, etc., and functional circuit block may be located by the boundaries of a function in the netlist, such as the beginning and end of a function. The netlist may be parsed to locate these functional circuit blocks. The functional circuit blocks include one or more sub-circuits. Sub-circuits may be made of one or more electrical components which together perform a specific purpose in the functional circuit block. There may be a relatively limited number of arrangements of electrical components capable of practically performing the purpose of a sub-circuit. These arrangements of electrical components may be predetermined, for example based on chip design experience, as a set of predetermined sub-circuits. In certain cases, this set of predetermined sub-circuits may not be exhaustive and may contain sub-circuits determined to be more likely to be found in analog circuit. In certain cases, the first sub-circuit may be identified based on a set of rules. In certain cases, these rules may be based, at least in part, on connections of the first sub-circuit.

At block 1206, sub-circuit physical parameter values associated with the first electrical component and the second electrical component of the first sub-circuit are identified. For example, the netlist may include physical parameters associated with electrical components of the circuit. Additionally, operating point simulations may be used to obtain operating parameters for the sub-circuit. At block 1208, a set of sub-circuit performance parameter values for the first sub-circuit are determined based on a first machine learning (ML) model of the first sub-circuit and the identified sub-circuit physical parameters For example, different types of sub-circuits may be associated with different sets of performance parameters. Examples of performance parameters include transconductance, channel conductance, minimum drain to source voltage, threshold voltage mismatch, etc. In certain cases, performance parameter values for a set of physical parameters associated with the identified first sub-circuit may be determined based on a first ML model of the identified sub-circuit. For example, physical parameters associated with the identified first sub-circuit may be input to a first trained ML model of the identified sub-circuit for the first process technology to determine performance parameter values for the identified first sub-circuit.

At block 1210, the identified first sub-circuit to a second sub-circuit for a second process technology is converted based on the determined set of sub-circuit performance parameter values. For example, a second ML model may be selected based on the type of the identified first sub-circuit. The second ML model may be configured to determine a second set of sub-circuit physical parameters associated with a third electrical component and a fourth electrical component of the second sub-circuit based on a second ML model, for the second process technology, and the set of sub-circuit performance parameter values, and associate sub-circuit physical parameters of the second set of sub-circuit physical parameters with the third electrical component and the fourth electrical component of the second sub-circuit. For example, performance parameters may be input to the second trained ML model of the identified sub-circuit for the second process technology to determine physical parameter values for electrical components of the second sub-circuit for the second process technology. In certain cases, the first and second trained ML models may be neural networks. A netlist for the second sub-circuit in the second process technology may then be determined based on the physical parameter values. At block 1212, the converted second sub-circuit may be output. For example, the netlist for the second sub-circuit may be output. In certain cases, the second process technology comprises a second semiconductor manufacturing process associated with smaller circuit electrical components as compared to a first process technology of the analog circuit. For example, the second process technology may be associated with smaller sized transistors, as compared to the first process technology. In certain cases, the second sub-circuit may be verified based on a circuit simulation of the second sub-circuit and performance parameters associated with the first sub-circuit. For example, the output netlist may be simulated on a circuit simulator to verify that performance parameters of the second sub-circuit are within a threshold amount of performance parameters associated with the first sub-circuit.

Figure 13:
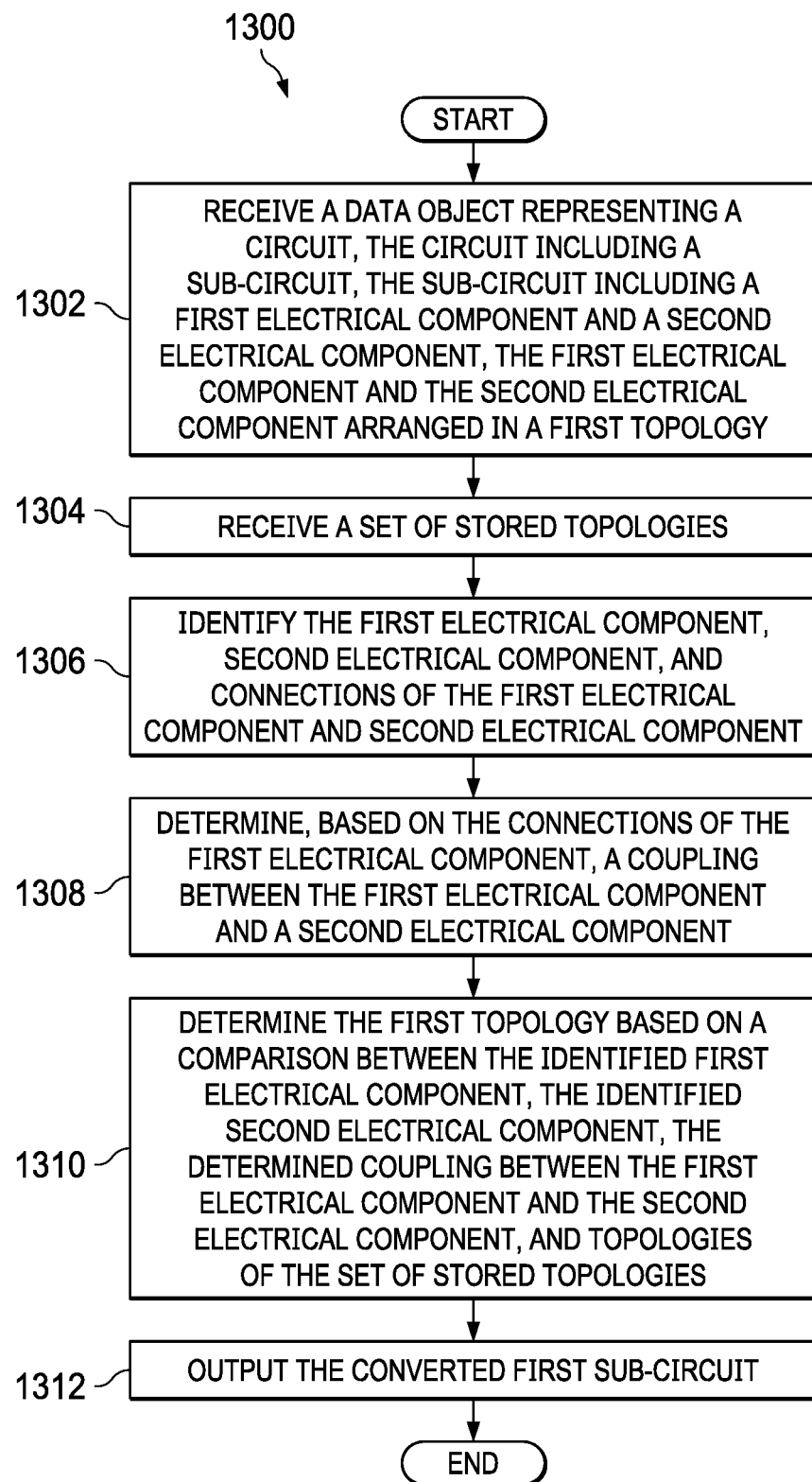
FIG. 13 is a flow diagram illustrating a technique for designing circuits, in accordance with aspects of the present disclosure.

FIG. 13 is a flow diagram illustrating an overview of a technique for designing analog circuits 1300, in accordance with aspects of the present disclosure. At block 1302, a data object representing a circuit is received, the circuit including a sub-circuit, the sub-circuit including a first electrical component and a second electrical component, the first electrical component and the second electrical component arranged in a first topology. For example, the analog circuit may be described as a netlist, including one or more circuit blocks. These circuit blocks each include one or more electrical components, such as transistors, resistors, capacitors, inductors, diodes, etc. of the circuit block. At block 1304, a set of stored topologies are received. For example, a library of trained ML models, including trained ML models for known sub-circuits may be stored and accessed from a memory storage. At block 1306, the first electrical component, second electrical component, and connections of the first electrical component and second electrical component may be identified. For example, a first electrical component of the functional circuit block may be identified based on a set of predefined electrical component types stored in a memory storage. For example, electrical components play a particular role within a functional circuit block and the role of a first electrical component may be determined based on what other electrical components the first electrical component is connected to. This role, along with a type of electrical component, may be used to identify the first electrical component from a set of predetermined electrical components. In certain cases, the first circuit may be identified based on a set of rules. At block 1308, a coupling between the first electrical component and a second electrical component is determined, based on the connections of the first electrical component. For example, the netlist may include a description of connections as between electrical components and this description may be parsed to determine connections as between electrical components. Parsing may be performed using a set of rules. In certain cases, rules of the set of parsing rules may be based, at least in part, on an identified type of the first electrical component, connections of the first electrical component, and an identified type of the second electrical component. As an example, this set of rules may describe the possible connections of the electrical component and mapping those connections to various sub-circuit types or topologies. In certain cases, rules of the set of parsing rules may be based, at least in part, on physical parameters of the first electrical component and second electrical component.

At block 1310, the first topology is determined based on a comparison between the identified first electrical component, the identified second electrical component, the determined coupling between the first electrical component and the second electrical component, and topologies of the set of stored topologies. At block 1312, the identified first topology may be output. For example, the identified topology may be output for use by one or more ML models for predicting sub-circuit performance parameters or sub-circuit physical parameters. In certain cases, a determination, based on the comparison, is made that multiple topologies of the set of stored topologies could match. In such cases, a third electrical component and connections of the third electrical component may be identified and, based on the connections of the third electrical component, a coupling between the third electrical component and either the first electrical component or the second electrical component is determined. The topologies of the set of stored topologies are compared to the identified first electrical component, the identified second electrical component, the identified third electrical component, the determined coupling between the first electrical component and the second electrical component, and the identified coupling between the third electrical component and either the first electrical component or the second electrical component to identify the first topology. For example, if multiple matches between a set of electrical components and topologies of the set of known topologies are found, the set of electrical components may be expanded to include additional electrical components coupled to the current electrical components of the set of electrical components. Matching against the set of known topologies may then be performed again with the expanded set of electrical components.

Figure 14:
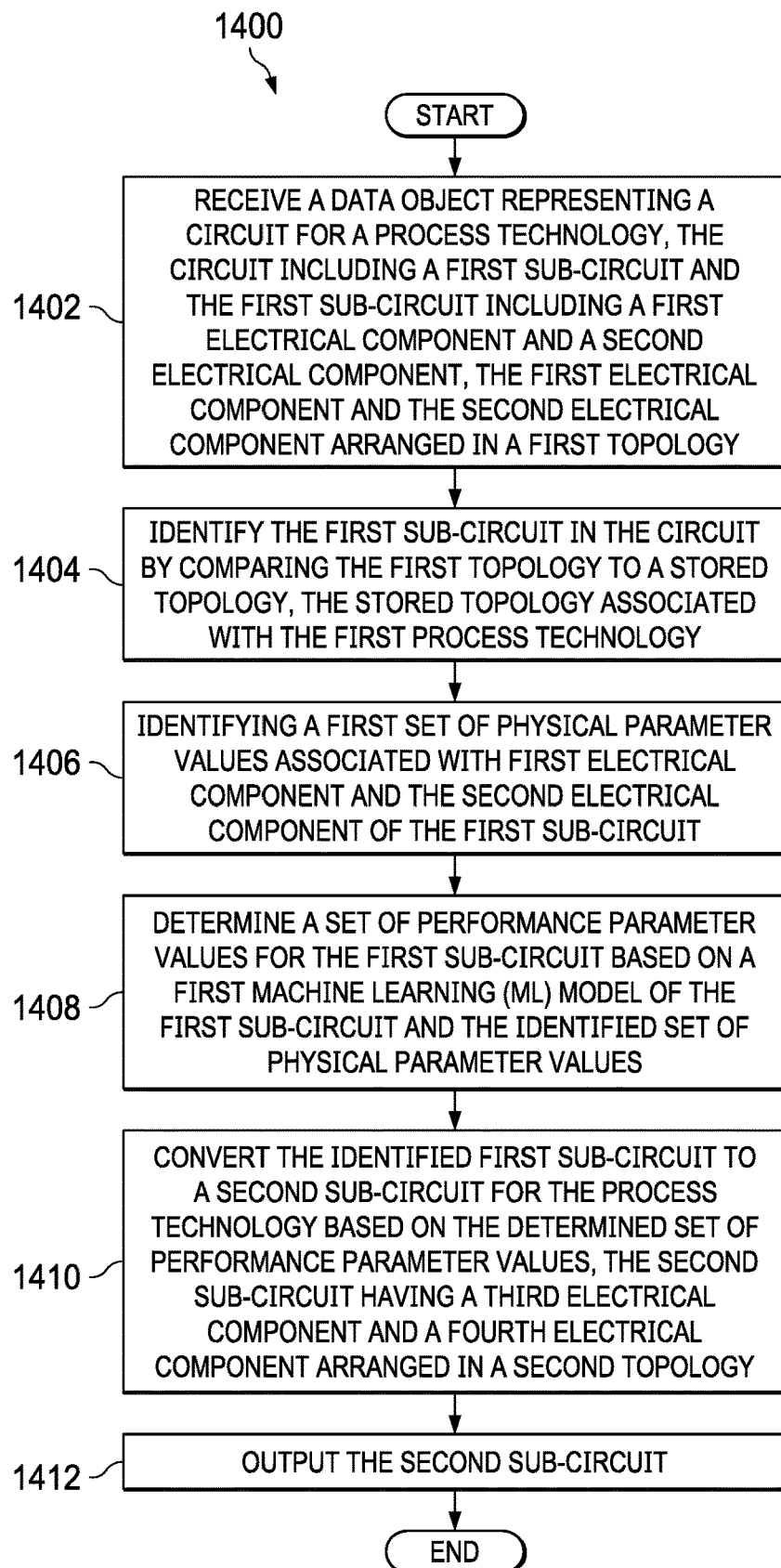
FIG. 14 is a flow diagram illustrating a technique for designing circuits, in accordance with aspects of the present disclosure.

FIG. 14 is a flow diagram illustrating a technique for identifying sub-circuits 1400, in accordance with aspects of the present disclosure. At block 1402, a data object representing a circuit for a process technology is received, the circuit including a first sub-circuit and the first sub-circuit including a first electrical component and a second electrical component, the first electrical component and the second electrical component arranged in a first topology. For example, the analog circuit may be described as a netlist, including one or more circuit blocks. The functional circuit blocks include one or more sub-circuits. The sub-circuits may be made of a set of electrical components which together perform a specific purpose in the functional circuit block. At block 1404, the first sub-circuit in the circuit is identified by comparing the first topology to a stored topology, the stored topology associated with the first process technology. For example, there may be a relatively limited number of arrangements of electrical components capable of practically performing the purpose of a sub-circuit. These arrangements of electrical components may be predetermined, for example based on chip design experience, as a set of predetermined sub-circuits. In certain cases, this set of predetermined sub-circuits may not be exhaustive and may contain sub-circuits determined to be more likely to be found in analog circuits. The first sub-circuit may be compared to the set of predetermined sub-circuits.

At block 1406, a first set of physical parameter values associated with first electrical component and the second electrical component of the first sub-circuit is identified. For example, the netlist may include physical parameters associated with electrical components of the circuit. Additionally, operating point simulations may be used to obtain operating parameters for the sub-circuit. At block 1406, a set of performance parameter values for the first sub-circuit is determined based on a first machine learning (ML) model of the first sub-circuit and the identified set of physical parameter values. For example, different types of sub-circuits may be associated with different sets of performance parameters. Examples of performance parameters include transconductance, channel conductance, minimum drain to source voltage, threshold voltage mismatch, etc. In certain cases, performance parameter values for a set of physical parameters associated with the identified first sub-circuit may be determined based on a first ML model of the identified sub-circuit. For example, physical parameters associated with the identified first sub-circuit may be input to a first trained ML model of the identified sub-circuit for the first process technology to determine performance parameter values for the identified first sub-circuit. At block 1408, the identified first sub-circuit is converted to a second sub-circuit for the process technology based on the determined set of performance parameter values, the second sub-circuit having a third electrical component and a fourth electrical component arranged in a second topology. In certain cases, a type of the first sub-circuit is identified based on connections of the first electrical component and the second electrical component. The determined set of performance parameter values are input to one or more ML models of the identified type of the first sub-circuit for the processing technology. one or more sets of physical parameter values corresponding to one or more topologies associated with the type of the first sub-circuit are received. The second topology is selected from the one or more topologies. In certain cases, selecting the second topology is based on an optimization function. This optimization function may be based on a number of electrical components of topologies of the one or more topologies. In certain cases, the optimization function is based on physical parameter values corresponding to one or more topologies Physical parameters values of a set of physical parameter values corresponding to the selected second topology are associated with the third electrical component and the fourth electrical component.

Figure 15:
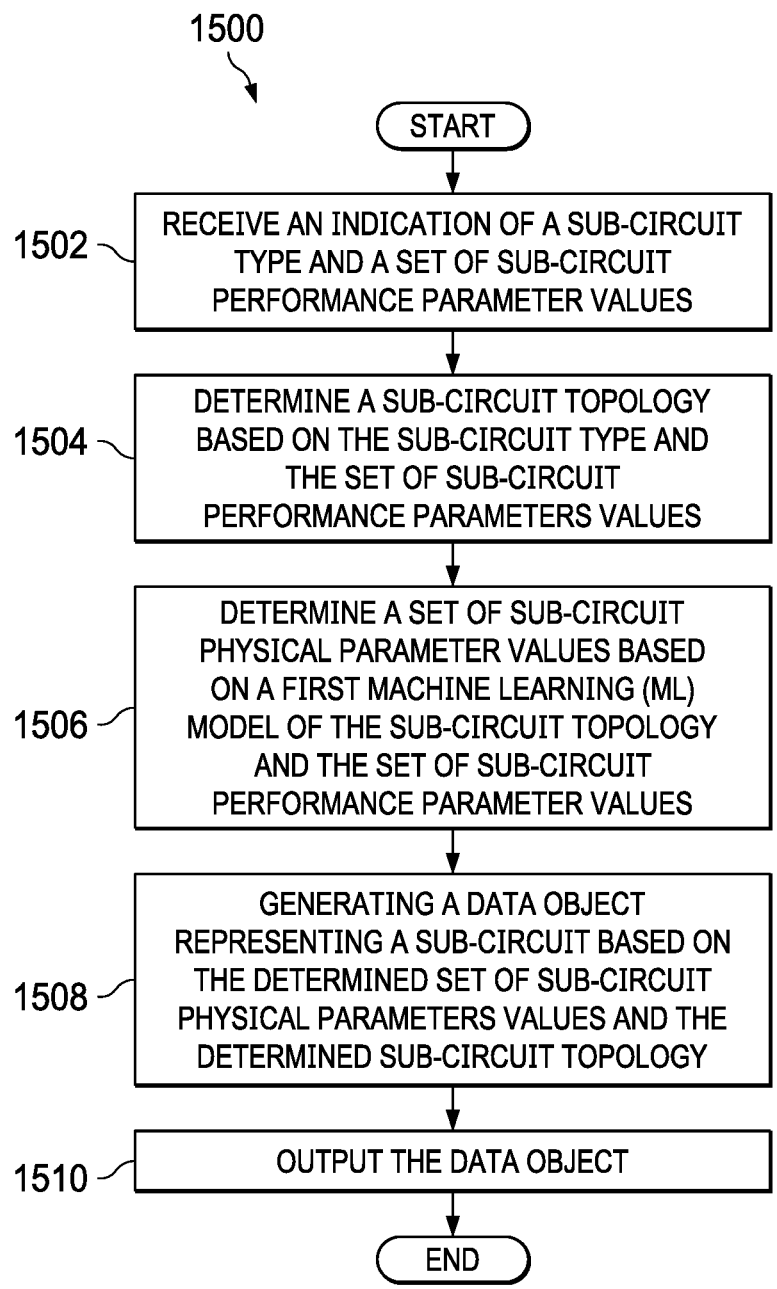
FIG. 15 is a flow diagram illustrating a technique for designing circuits, in accordance with aspects of the present disclosure.

FIG. 15 is a flow diagram illustrating a technique for designing circuits 1500, in accordance with aspects of the present disclosure. At block 1502, an indication of a sub-circuit type and a set of sub-circuit performance parameter values may be received. For example, a user may provide an indication of a type of sub-circuit and one or more sub-circuit performance parameters values for the sub-circuit type. At block 1504, a sub-circuit topology may be determined based on the sub-circuit type and the set of sub-circuit performance parameters values. For example, a specific sub-circuit topology for the sub-circuit type may be provided and a ML model for the sub-circuit type may be identified. As another example, the sub-circuit performance parameter values may be provided to multiple sub-circuit ML models corresponding to the sub-circuit type. This set of sub-circuit ML models, and corresponding sub-circuit topologies, may be obtained from a ML model library. The sub-circuit performance parameter values may be input to sub-circuit ML models of the set of sub-circuit ML models to determine corresponding sub-circuit physical parameters for the sub-circuit topologies corresponding to the sub-circuit ML models. In certain cases, if sub-circuit physical parameters for a sub-circuit topology cannot be determined for the sub-circuit performance parameters, then the sub-circuit topology, may be removed from the set of sub-circuit topologies. An optimization function may then be applied to the sub-circuit topologies of the set of sub-circuit topologies to select a sub-circuit topology. The optimization function may be any known optimization technique, such as cost function, loss function, etc. As an example, the optimization function may select a sub-circuit topology based on a least number of electrical components with sub-circuit physical parameters of those electrical components within a certain range, the range selected for ease of manufacture based on the first process technology.

At block 1506, a set of sub-circuit physical parameter values are determined based on a first machine learning (ML) model of the sub-circuit topology and the set of sub-circuit performance parameter values. In certain cases, the set of sub-circuit physical parameters values may be determined as a part of determining a sub-circuit topology. At block 1508, a data object representing a sub-circuit based on the determined set of sub-circuit physical parameter values and the determined sub-circuit topology is generated. For example, a netlist representation of the sub-circuit may be generated using the determined sub-circuit topology and the determined sub-circuit physical parameter values. At block 1510, the data object is output.

Figure 16:
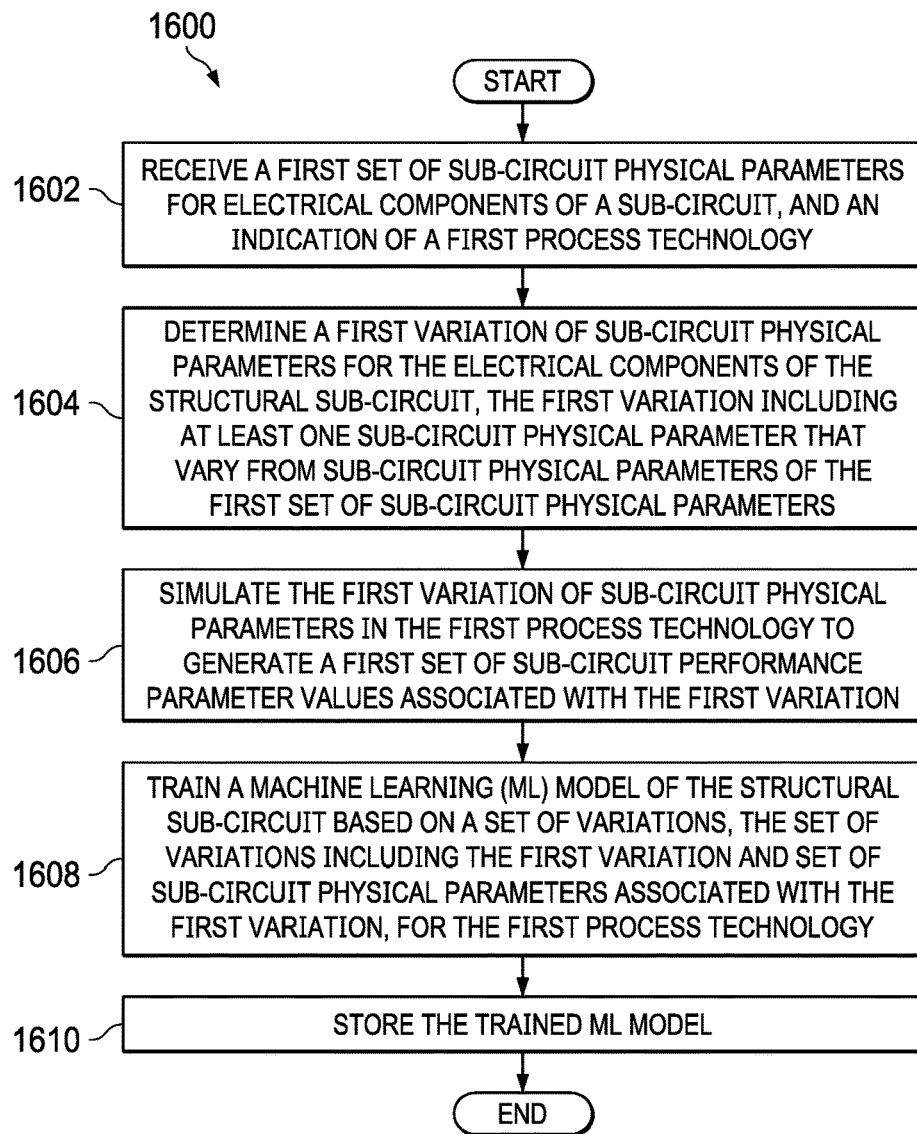
FIG. 16 is a flow diagram illustrating a technique for designing circuits, in accordance with aspects of the present disclosure.

FIG. 16 is a flow diagram illustrating a technique for designing circuits 1600, in accordance with aspects of the present disclosure. At block 1602, a first set of sub-circuit physical parameters for electrical components of a sub-circuit, and an indication of a first process technology is received. For example, physical parameters for electrical components of a first sub-circuit may be received, along with a description of how those electrical components are connected, as well as information related to the process technology the first sub-circuit is associated with may be received. In certain cases, a set of performance parameters may also be received, the performance parameters indicating which performance parameters may be applicable for the first sub-circuit. At block 1604, a first variation of sub-circuit physical parameters for the electrical components of the structural sub-circuit is determined, the first variation including at least one sub-circuit physical parameter that vary from sub-circuit physical parameters of the first set of sub-circuit physical parameters. In certain cases, determining sets of variations of physical parameters for the electrical components of the sub-circuit includes determining variations of physical parameters for the electrical components based on a practical range of physical parameter values for the first process technology. At block 1606, the first variation of sub-circuit physical parameters in the first process technology is simulated to generate a first set of sub-circuit performance parameter values associated with the first variation. For example, for a particular sub-circuit, sets of physical parameters may be generated by simulating the particular sub-circuit with sets of physical parameter values. Physical parameter values of these sets of physical parameter values may vary across ranges of practical values associated with respective physical parameter values. In certain cases, the sets of variations of physical parameters are identified to show non-linear behavior of the sub-circuit. In certain cases, the sets of variations of physical parameters for the sub-circuit may be simulated using a simulation program with integrated circuit emphasis (SPICE) circuit model of the sub-circuit.

At block 1608, a machine learning (ML) model of the structural sub-circuit is trained based on a set of variations, the set of variations including the first variation and set of sub-circuit physical parameters associated with the first variation, for the first process technology. In certain cases, the ML model of the sub-circuit comprises one of a linear regression, large margin classifier, principle component analysis, tree based, or neural network machine learning model. In certain cases, training the ML model includes identifying a set of parameters for input to the ML model. In certain cases, the set of parameters for input to the ML model is based on one of: the sets of physical parameters or generated performance parameters and one of: one or more parameters associated with the first process technology or one or more parameters associated with the second process technology. At block 1610, the trained ML model is stored. In certain cases, the library of trained ML models includes a trained ML model for each sub-circuit of a set of predetermined sub-circuits. In certain cases, in the library of trained ML models, each trained ML model is associated with a specific sub-circuit and each trained ML model may differ from other trained ML models in the library of trained ML models.

Figure 17A:
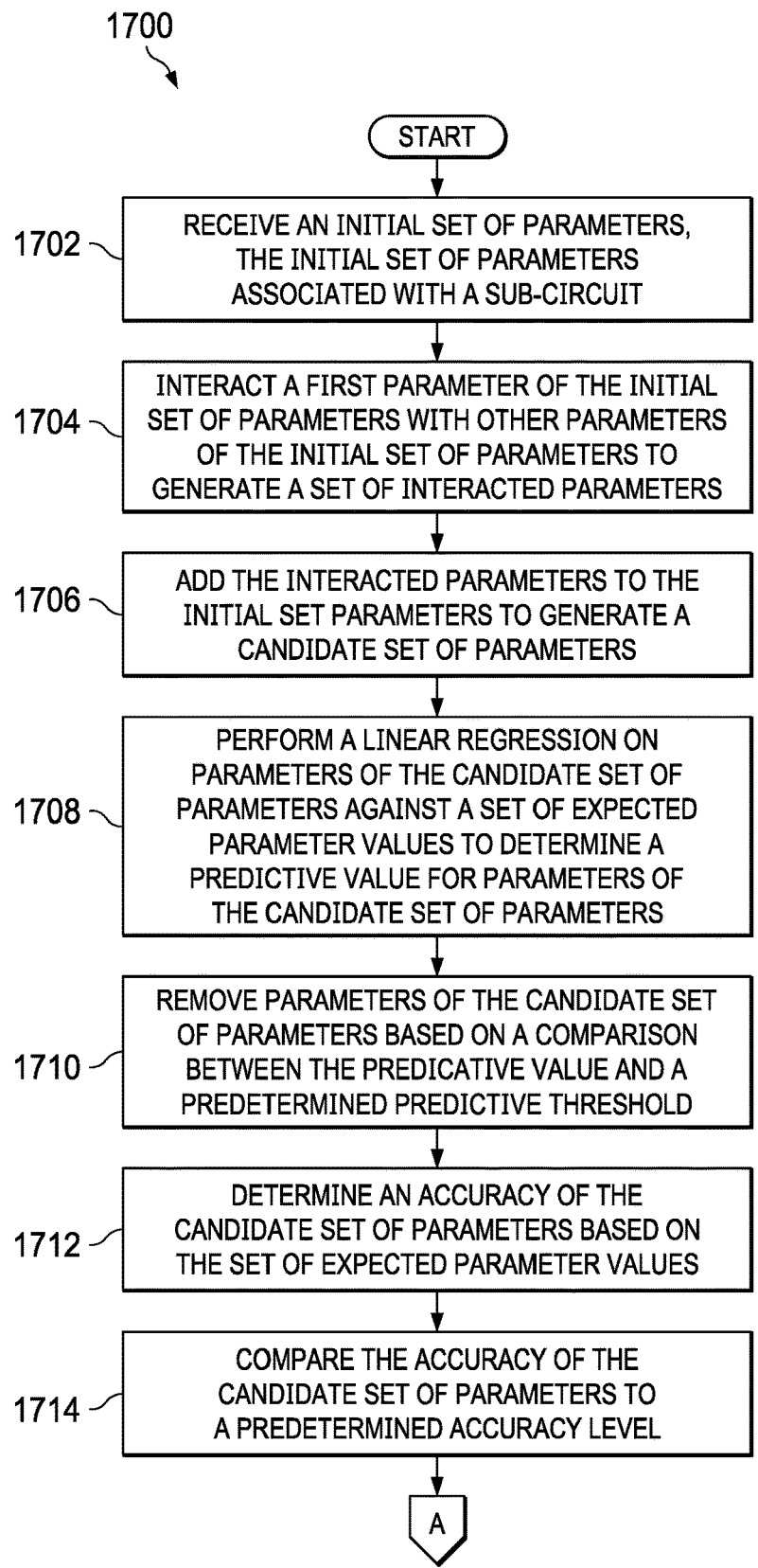
FIGS. 17A-17B are flow diagrams illustrating a technique for designing circuits, in accordance with aspects of the present disclosure.
Figure 17B:
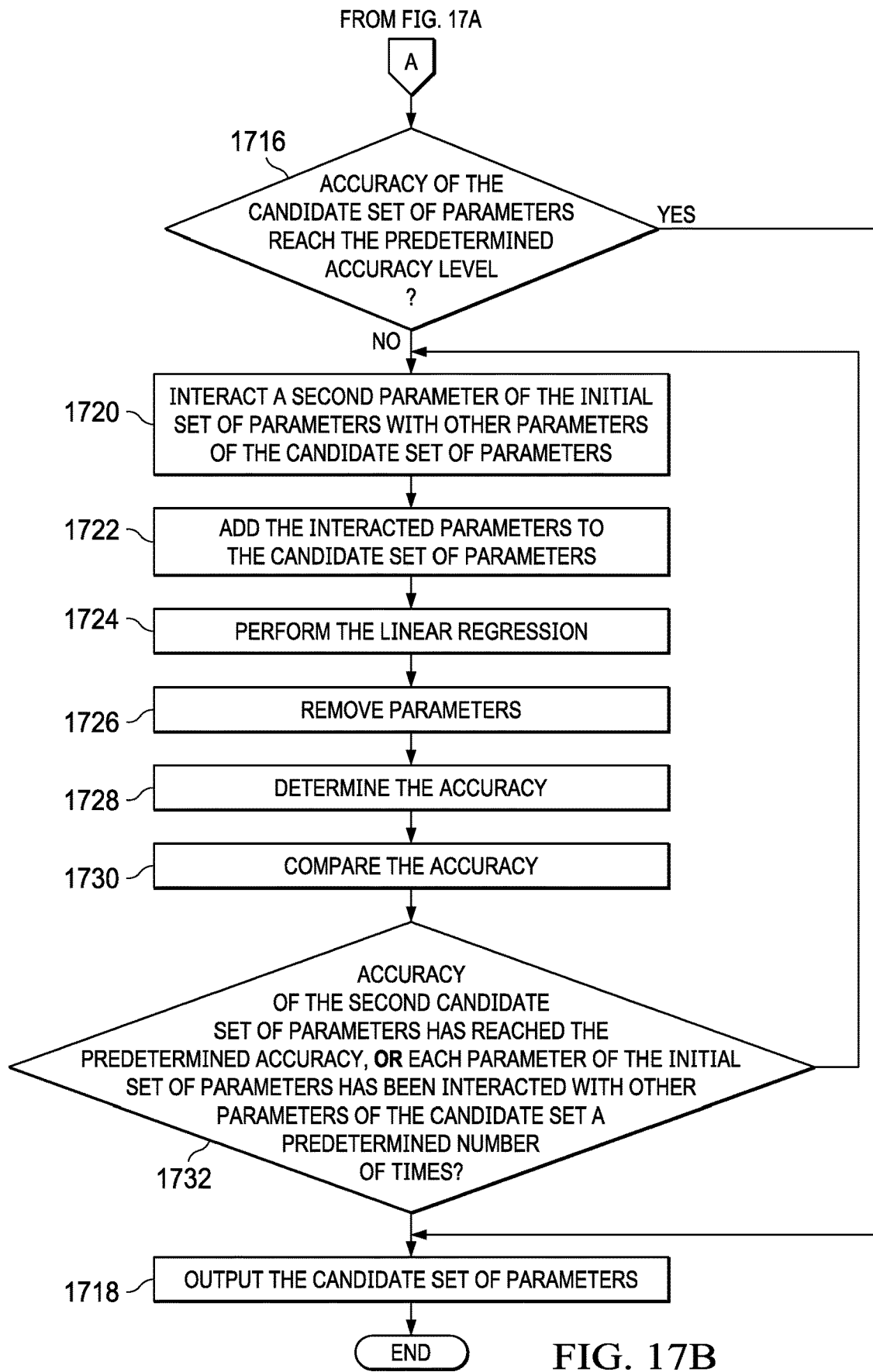

FIGS. 17A-17B are a flow diagram illustrating a technique for circuit modeling 1700, in accordance with aspects of the present disclosure. At block 1702, an initial set of parameters are received, the initial set of parameters associated with a sub-circuit. For example, a set of sub-circuit performance parameters or sub-circuit physical parameters for a ML model of a sub-circuit may be received. At block 1704, a first parameter of the initial set of parameters is interacted with other parameters of the initial set of parameters to generate a set of interacted parameters. For example, the first parameter may be interacted with another parameter of the set of parameters to generate an interacted parameter. At block 1706, the interacted parameter is added to the initial set parameters to generate a candidate set of parameters. For example, the interacted parameter may be added to the set of parameters. At block 1708, a linear regression may be performed on parameters of the candidate set of parameters against a set of expected parameter values to determine a predictive value for parameters of the candidate set of parameters. For example, the linear regression attempts to model a relationship between the parameters as compared to expected results of the ML model and a statistical significance test may be applied to the results of the linear regression to determine a statistical significance value of parameters of the set of parameters. In certain cases, this linear regression equation may be based on a Taylor series regression.

At block 1710, parameters of the candidate set of parameters are removed based on a comparison between the predicative value and a predetermined predictive threshold. For example, statistical significance value of parameters of the set of parameters may be compared to a predefined threshold and parameters which do not meet the predefined threshold may be removed from the set of parameters. In certain cases, statistical p-values may be compared against a minimum p-value and variables with p-values less than the minimum p-value may be removed from the candidate set. Multiple variables may be removed from the candidate set of variables in each round. At block 1712, an accuracy of the candidate set of parameters may be determined based on the set of expected parameter values. For example, the candidate set of parameters may be compared to the expected results to determine the accuracy. Predicted values based on the candidate set of variables may be compared against the expected set of parameter values to determine the accuracy for the candidate set of variables. In certain cases, each parameter of the initial set of parameters may be interacted with the other parameters of the initial set of parameters prior to the accuracy determination. For example, each of the original variables may be interacted with candidate variables of the set of candidate variables, even if the original variable is removed from the set of candidate variables. At block 1714, the accuracy of the candidate set of parameters may be compared to a predetermined accuracy level. At block 1716, if the accuracy of the candidate set of parameters reaches the predetermined accuracy level, the candidate set of parameters is output at block 1718. If the accuracy of the candidate set of parameters does not reached a predetermined accuracy level, certain steps may be repeated.

At block 1720, a second parameter of the initial set of parameters is interacted with other parameters of the candidate set of parameters. This interaction may be similar to the interaction discussed in conjunction with block 1704 where another parameter is interacted with another parameter of the set of parameters to generate the interacted parameter. At block 1722, the interacted parameter is added to the candidate set of parameters. For example, the interacted parameter may be added to the set of parameters. At block 1724, the linear regression may be performed on parameters of the candidate set of parameters against a set of expected parameter values to determine a predictive value for parameters of the candidate set of parameters. At block 1726, parameters of the candidate set of parameters are removed based on a comparison between the predicative value and a predetermined predictive threshold. At block 1728, the accuracy of the candidate set of parameters may be determined based on the set of expected parameter values. At block 1730, the accuracy of the candidate set of parameters may be compared to a predetermined accuracy level. At block 1732, if the accuracy of the second candidate set of parameters has reached the predetermined accuracy, the candidate set of parameters are output at block 1718. At block 1732, if each parameter of the initial set of parameters has been interacted with other parameters of the candidate set a predetermined number of times, the candidate set of parameters are output at block 1718. Otherwise, blocks 1720-1730 may be repeated with another parameter of the initial set of parameters.

In certain cases, the initial set of parameters may include one or more parameter values based on properties of the process technology. In certain cases, the initial set of parameters may include one or more parameter values based on theoretical interactions between one or more parameter values of the first set of parameters.

In certain cases where the accuracy has not reached the predetermined accuracy level, a second ML model may be trained based on the set of selected variables and parameter values of the second set of parameter values. For example, where the sufficient level of accuracy has not been met and the repeating ended after each variable in the original set of variables has been interacted a predetermined number of times, a final set of candidate variables may be used to train another ML model. If the other ML model is sufficiently accurate, the other ML model may be stored instead of the linear regression equation, for example, in a ML library. Additionally, an accuracy for the second ML model may be determined. Further, a determination may be made that the accuracy of the second ML is greater than the predetermined accuracy level, and the set of selected variables and second ML model may be stored as the first ML model for the sub-circuit for the process technology. In certain cases, the second ML model may be a neural network. In certain cases, Bayesian hyperparameter optimization may be applied to the second ML model. In certain cases, the hyperparameters being optimized by the Bayesian hyperparameter optimization include one of: a number of layers of neurons of the neural network, a number of neurons in each layer of the neural network, and a weight decay value.

Figure 18:
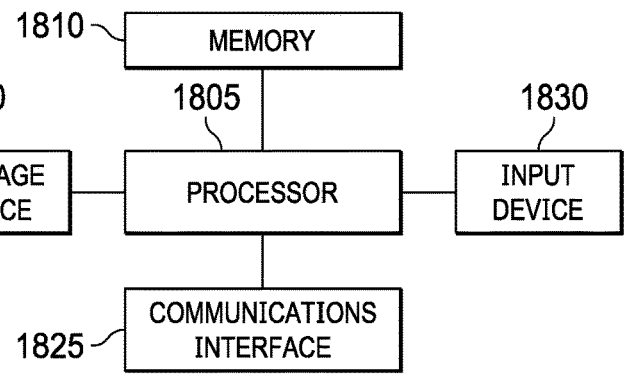
FIG. 18 is a block diagram of an embodiment of a computing device, in accordance with aspects of the present disclosure.

As illustrated in FIG. 18, device 1800 includes a processing element such as processor 1805 that contains one or more hardware processors, where each hardware processor may have a single or multiple processor cores. Examples of processors include, but are not limited to, a central processing unit (CPU) or a microprocessor. Although not illustrated in FIG. 18, the processing elements that make up processor 1805 may also include one or more other types of hardware processing components, such as graphics processing units (GPUs), application specific integrated circuits (ASICs), field-programmable gate arrays (FPGAs), and/or digital signal processors (DSPs). In certain cases, processor 1805 may be configured to perform functions described in conjunction with FIGS. 5, 6, 8, 11, and 12-17. It may also be understood that while described in conjunction with a single device, the functions described may be performed by any number of processing elements and that these processing elements may associated with multiple devices that are communicatively coupled. For example, generation of ML models, ML libraries, netlists, etc. may be performed on a separate device as compared to the conversion or optimization of a circuit. In certain cases, these various devices may be networked by any known networking technology, examples of which include ethernet, wireless fidelity (Wi-Fi), internet, etc. In certain cases, data objects may be provided and/or received via non-transitory computer readable storage medium.

FIG. 18 illustrates that memory 1810 may be operatively and communicatively coupled to processor 1805. Memory 1810 may be a non-transitory computer readable storage medium configured to store various types of data. For example, memory 1810 may include one or more volatile devices such as random access memory (RAM). In certain cases, the SRAM and circuits as described in FIGS. 4-8 may be incorporated as part of the memory 1810. Non-volatile storage devices 1820 can include one or more disk drives, optical drives, solid-state drives (SSDs), tap drives, flash memory, electrically programmable read only memory (EEPROM), and/or any other type memory designed to maintain data for a duration time after a power loss or shut down operation. The non-volatile storage devices 1820 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 1805. In one embodiment, the compiling process of the software program may transform program code written in a programming language to another computer language such that the processor 1805 is able to execute the programming code. For example, the compiling process of the software program may generate an executable program that provides encoded instructions (e.g., machine code instructions) for processor 1805 to accomplish specific, non-generic, particular computing functions.

After the compiling process, the encoded instructions may then be loaded as computer executable instructions or process steps to processor 1805 from storage 1820, from memory 1810, and/or embedded within processor 1805 (e.g., via a cache or on-board ROM). Processor 1805 may be configured to execute the stored instructions or process steps in order to perform instructions or process steps to transform the computing device into a non-generic, particular, specially programmed machine or apparatus. Stored data, e.g., data stored by a storage device 1820, may be accessed by processor 1805 during the execution of computer executable instructions or process steps to instruct one or more components within the computing device 1800. Storage 1820 may be partitioned or split into multiple sections that may be accessed by different software programs. For example, storage 1820 may include a section designated for specific purposes, such as storing program instructions or data for updating software of the computing device 1800. In one embodiment, the software to be updated includes the ROM, or firmware, of the computing device. In certain cases, the computing device 1800 may include multiple operating systems. For example, the computing device 1800 may include a general-purpose operating system which is utilized for normal operations. The computing device 1800 may also include another operating system, such as a bootloader, for performing specific tasks, such as upgrading and recovering the general-purpose operating system, and allowing access to the computing device 1800 at a level generally not available through the general-purpose operating system. Both the general-purpose operating system and another operating system may have access to the section of storage 1820 designated for specific purposes.

The one or more communications interfaces may include a radio communications interface for interfacing with one or more radio communications devices. In certain cases, elements coupled to the processor may be included on hardware shared with the processor. For example, the communications interfaces 1825, storage, 1820, and memory 1810 may be included, along with other elements such as the digital radio, in a single chip or package, such as in a system on a chip (SOC). Computing device may also include input and/or output devices, not shown, examples of which include sensors, cameras, human input devices, such as mouse, keyboard, touchscreen, monitors, display screen, tactile or motion generators, speakers, lights, etc. Processed input, for example from the radar device 1830, may be output from the computing device 1800 via the communications interfaces 1825 to one or more other devices.

Modifications are possible in the described embodiments, and other embodiments are possible, within the scope of the claims.

For example, first process technology characterization module 810 may be implemented using any number of determination techniques, such as statistical regression analysis and statistical classifiers such as neural networks, decision trees, Bayesian classifiers, fuzzy logic-based classifiers, deep learning, and statistical pattern recognition Likewise, and as another example, second process technology characterization module 820 may be implemented using any number of determination techniques, such as statistical regression analysis and statistical classifiers such as neural networks, decision trees, Bayesian classifiers, fuzzy logic-based classifiers, deep learning, and statistical pattern recognition.

What is claimed is:

1. A method comprising:
   producing a first machine learning (ML) model, including receiving an initial set of parameters, wherein the initial set of parameters represents inputs to the first ML model, the initial set of parameters associated with a sub-circuit;
   interacting a first parameter of the initial set of parameters with other parameters of the initial set of parameters to generate a set of interacted parameters;
   adding the interacted parameter to the initial set of parameters to generate a candidate set of parameters;
   performing a linear regression on parameters of the candidate set of parameters against a set of expected parameter values to determine a predictive value for parameters of the candidate set of parameters;
   removing parameters of the candidate set of parameters based on a comparison between the predictive value and a predetermined predictive threshold;
   determining an accuracy of the candidate set of parameters based on the set of expected parameter values;
   comparing the accuracy of the candidate set of parameters to a predetermined accuracy level;
   determining that the accuracy of the candidate set of parameters reaches the predetermined accuracy level;
   in response to determining that the accuracy of the candidate set of parameters reaches the predetermined accuracy level, storing the candidate set of parameters as a set of inputs for a first layer of the first ML model for the sub-circuit for a process technology; and
   training the first ML model using the candidate set of parameters stored as the set of inputs, thereby producing a trained ML model.

2. The method of claim 1, wherein determining the predictive value for the parameters of the candidate set of parameters includes determining a statistical significance value for each parameter of the candidate set of parameters, and wherein removing the parameters is based on a comparison between the statistical significance value for each parameter of the candidate set of parameters and the predetermined predictive threshold.

3. The method of claim 1, wherein the initial set of parameter includes an interaction parameter modeling how two or more other parameters, of the initial set of parameters, interact.

4. The method of claim 3, wherein the interaction parameter is based on a circuit theory equation.

5. The method of claim 1, wherein the initial set of parameters includes one or more sub-circuit physical parameters associated with the sub-circuit and wherein the set of expected parameter values includes one or more sub-circuit performance parameters associated with the sub-circuit.

6. The method of claim 1, wherein the initial set of parameters include one or more sub-circuit performance parameters associated with the sub-circuit and wherein the set of expected parameter values includes one or more sub-circuit physical parameters associated with the sub-circuit.

7. The method of claim 1, wherein the initial set of parameters includes one or more parameter values based on properties of the process technology.

8. A non-transitory program storage device comprising instructions stored thereon to cause one or more processors to:
   produce a first machine learning (ML) model, including receiving an initial set of parameters, wherein the initial set of parameters represents inputs to the first ML model, the initial set of parameters associated with a sub-circuit;
   interact a first parameter of the initial set of parameters with other parameters of the initial set of parameters to generate a set of interacted parameters;
   add the interacted parameter to the initial set of parameters to generate a candidate set of parameters;
   perform a linear regression on parameters of the candidate set of parameters against a set of expected parameter values to determine a predictive value for parameters of the candidate set of parameters;
   remove parameters of the candidate set of parameters based on a comparison between the predictive value and a predetermined predictive threshold;
   determine an accuracy of the candidate set of parameters based on the set of expected parameter values;
   compare the accuracy of the candidate set of parameters to a predetermined accuracy level;
   wherein if the accuracy of the candidate set of parameters reaches the predetermined accuracy level, store the candidate set of parameters as a first set of inputs for a first layer of the first ML model for the sub-circuit for a process technology; and
   wherein if the accuracy of the candidate set of parameters does not reach the predetermined accuracy level, perform at least one more iteration of interaction to add to the candidate set of parameters and linear regression to remove from the candidate set of parameters until the accuracy of the candidate set of parameters has reached the predetermined accuracy level and then store the candidate set of parameters as a second set of inputs for the first layer of the first ML model for the sub-circuit for the process technology; and train the first ML model using the candidate set of parameters stored as the first or second set of inputs, thereby producing a trained ML model.

9. The non-transitory program storage device of claim 8, wherein the predictive value for the parameters of the candidate set of parameters includes a statistical significance value for each parameter of the candidate set of parameters, and wherein the instructions to cause the one or more processors to remove parameters of the candidate set of parameters includes instructions to cause the one or more processors to remove parameters based on a comparison between the statistical significance value for each parameter of the candidate set of parameters and the predetermined predictive threshold.

10. The non-transitory program storage device of claim 8, wherein the initial set of parameter includes an interaction parameter modeling how two or more other parameters, of the initial set of parameters, interact.

11. The non-transitory program storage device of claim 10, wherein the interaction parameter is based on a circuit theory equation.

12. The non-transitory program storage device of claim 8, wherein the initial set of parameters includes one or more sub-circuit physical parameters associated with the sub-circuit and wherein the set of expected parameter values includes one or more sub-circuit performance parameters associated with the sub-circuit.

13. The non-transitory program storage device of claim 8, wherein the initial set of parameters include one or more sub-circuit performance parameters associated with the sub-circuit and wherein the set of expected parameter values includes one or more sub-circuit physical parameters associated with the sub-circuit.

14. The non-transitory program storage device of claim 8, wherein the initial set of parameters includes one or more parameter values based on properties of the process technology.

15. An electronic device, comprising:
a memory; and
one or more processors operatively coupled to the memory, wherein the one or more processors are configured to execute instructions causing the one or more processors to:
produce a first machine learning (ML) model, including receiving an initial set of parameters, wherein the initial set of parameters represents inputs to the first ML model, the initial set of parameters associated with a sub-circuit;
interact a first parameter of the initial set of parameters with other parameters of the initial set of parameters to generate a set of interacted parameters;
add the interacted parameter to the initial set of parameters to generate a candidate set of parameters;
perform a linear regression on parameters of the candidate set of parameters against a set of expected parameter values to determine a predictive value for parameters of the candidate set of parameters;
remove parameters of the candidate set of parameters based on a comparison between the predictive value and a predetermined predictive threshold;
determine an accuracy of the candidate set of parameters based on the set of expected parameter values;
compare the accuracy of the candidate set of parameters to a predetermined accuracy level;
wherein if the accuracy of the candidate set of parameters reaches the predetermined accuracy level, store the candidate set of parameters as a first set of inputs for a first layer of the first ML model for the sub-circuit for a process technology; and
wherein if the accuracy of the candidate set of parameters does not reach the predetermined accuracy level, perform at least one more iteration of interaction to add to the candidate set of parameters and linear regression to remove from the candidate set of parameters until the accuracy of the candidate set of parameters has reached the predetermined accuracy level and then store the candidate set of parameters as a second set of inputs for the first layer of the first ML model for the sub-circuit for the process technology; and
train the first ML model using the candidate set of parameters stored as the first or second set of inputs, thereby producing a trained ML model.

16. The electronic device of claim 15, wherein the predictive value for the parameters of the candidate set of parameters includes a statistical significance value for each parameter of the candidate set of parameters, and wherein the instructions to cause the one or more processors to remove parameters of the candidate set of parameters includes instructions to cause the one or more processors to remove parameters based on a comparison between the statistical significance value for each parameter of the candidate set of parameters and the predetermined predictive threshold.

17. A method comprising:
producing a first machine learning (ML) model, including receiving an initial set of parameters, wherein the initial set of parameters represents inputs to the first ML model, the initial set of parameters associated with a sub-circuit;
interacting a first parameter of the initial set of parameters with other parameters of the initial set of parameters to generate a set of interacted parameters;
adding the interacted parameter to the initial set of parameters to generate a candidate set of parameters;
performing a linear regression on parameters of the candidate set of parameters against a set of expected parameter values to determine a predictive value for parameters of the candidate set of parameters;
removing parameters of the candidate set of parameters based on a comparison between the predictive value and a predetermined predictive threshold;
determining an accuracy of the candidate set of parameters based on the set of expected parameter values;
comparing the accuracy of the candidate set of parameters to a predetermined accuracy level;
determining that the accuracy of the candidate set of parameters does not reach the predetermined accuracy level;
in response to determining that the accuracy of the candidate set of parameters does not reach the predetermined accuracy level, performing at least one more iteration of interaction to add to the candidate set of parameters and linear regression to remove from the candidate set of parameters until the accuracy of the candidate set of parameters has reached the predetermined accuracy level;

storing the candidate set of parameters as a set of inputs for a first layer of the first ML model for the sub-circuit for a process technology; and training the first ML model using the candidate set of parameters stored as the set of inputs, thereby producing a trained ML model.

18. The method of claim 17, wherein determining the predictive value for the parameters of the candidate set of parameters includes determining a statistical significance value for each parameter of the candidate set of parameters, and wherein removing the parameters is based on a comparison between the statistical significance value for each parameter of the candidate set of parameters and the predetermined predictive threshold.

19. A method comprising:

producing a first machine learning (ML) model, including receiving an initial set of parameters, wherein the initial set of parameters represents inputs to the first ML model, the initial set of parameters associated with a sub-circuit;

interacting a first parameter of the initial set of parameters with other parameters of the initial set of parameters to generate a set of interacted parameters;

adding the interacted parameter to the initial set of parameters to generate a candidate set of parameters;

performing a linear regression on parameters of the candidate set of parameters against a set of expected parameter values to determine a predictive value for parameters of the candidate set of parameters;

removing parameters of the candidate set of parameters based on a comparison between the predictive value and a predetermined predictive threshold;

determining an accuracy of the candidate set of parameters based on the set of expected parameter values;

comparing the accuracy of the candidate set of parameters to a predetermined accuracy level;

determining that the accuracy of the candidate set of parameters does not reach the predetermined accuracy level;

in response to determining that the accuracy of the candidate set of parameters does not reach the predetermined accuracy level, performing at least one more iteration of interaction to add to the candidate set of parameters and linear regression to remove from the candidate set of parameters until each parameter of the initial set of parameters has been interacted with other parameters of the candidate set a predetermined number of times;

training a second ML model based on the candidate set of parameters and the set of expected parameter values;

tuning a hyperparameter of the second ML model;

determining the accuracy for the second ML model;

determining that the accuracy of the second ML is greater than the predetermined accuracy level; and storing the candidate set of parameters as a set of inputs for the second ML model for the sub-circuit for a process technology; and training the second ML model using the candidate set of parameters stored as the set of inputs, thereby producing a trained ML model.

20. The method of claim 19, wherein tuning the hyperparameter comprises applying Bayesian hyperparameter optimization to the hyperparameter.

* * * * *